United States Patent
Kazama et al.

(10) Patent No.: US 11,674,970 B2
(45) Date of Patent: Jun. 13, 2023

(54) AUTOMATIC ANALYSIS DEVICE AND AUTOMATIC ANALYSIS METHOD

(71) Applicant: HITACHI HIGH-TECH CORPORATION, Tokyo (JP)

(72) Inventors: Yuto Kazama, Tokyo (JP); Masahiko Iijima, Tokyo (JP); Sakuichiro Adachi, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 281 days.

(21) Appl. No.: 17/197,155

(22) Filed: Mar. 10, 2021

(65) Prior Publication Data

US 2021/0190806 A1   Jun. 24, 2021

Related U.S. Application Data

(63) Continuation of application No. 16/308,516, filed as application No. PCT/JP2017/022334 on Jun. 16, 2017, now Pat. No. 10,976,333.

(30) Foreign Application Priority Data

Jul. 19, 2016   (JP) ................................. 2016-141689

(51) Int. Cl.
  *G01N 1/00*   (2006.01)
  *G01N 35/04*  (2006.01)
  (Continued)

(52) U.S. Cl.
  CPC ............. *G01N 35/04* (2013.01); *G01N 21/27* (2013.01); *G01N 21/78* (2013.01);
  (Continued)

(58) Field of Classification Search
  None
  See application file for complete search history.

(56) References Cited

U.S. PATENT DOCUMENTS

| 6,750,063 B1 | 6/2004 | Kawamura |
| 2012/0141330 A1 | 6/2012 | Adachi et al. |
| 2015/0160251 A1* | 6/2015 | Yokokawa ......... G01N 35/1002 422/82.09 |

FOREIGN PATENT DOCUMENTS

| EP | 1 096 248 A2 | 5/2001 |
| EP | 2 650 673 A1 | 10/2013 |

(Continued)

OTHER PUBLICATIONS

Communication Pursuant to Article 94(3) EPC received in corresponding European Application No. 17 830 772.4 dated May 31, 2021.

(Continued)

*Primary Examiner* — Jyoti Nagpaul
(74) *Attorney, Agent, or Firm* — Mattingly & Malur, PC

(57) ABSTRACT

An automatic analysis device has a plurality of types of photometers having different quantitative ranges, and an analysis control unit for quantifying the desired component in specimens based on measurement values of one or more photometers selected from among the plurality of types of photometers. The analysis control unit: sets a switching region in an overlap region of respective quantitative ranges of the plurality of types of photometers, said switching region having a greater width than does the variation in quantitative values of the desired component based on the measurement values of photometers having the same specimen; compares the quantitative value of a quantitative range portion that corresponds to the switching region and the quantitative values of the desired component based on the measurement values of the photometers; and selects a photometer to be used in quantitative output of the desired component from among the plurality of types of photometers.

15 Claims, 6 Drawing Sheets

(51) Int. Cl.
    *G01N 21/78*   (2006.01)
    *G01N 21/27*   (2006.01)
    *G01N 35/10*   (2006.01)
    G01N 35/00    (2006.01)

(52) U.S. Cl.
    CPC ..... *G01N 35/1002* (2013.01); *G01N 35/1065* (2013.01); *G01N 2035/00396* (2013.01); *G01N 2035/00435* (2013.01); *G01N 2035/00534* (2013.01); *G01N 2035/0441* (2013.01); *G01N 2035/0443* (2013.01); *G01N 2035/0453* (2013.01); *G01N 2035/0475* (2013.01)

(56) References Cited

FOREIGN PATENT DOCUMENTS

| | | |
|---|---|---|
| JP | 11-344439 A | 12/1999 |
| JP | 2005-189245 A | 7/2005 |
| JP | 2014-006160 A | 1/2014 |
| JP | 2015-21952 A | 2/2015 |
| JP | 2015-515006 A | 5/2015 |
| WO | 2011/004781 A | 1/2011 |
| WO | 2013/160425 A1 | 10/2013 |

OTHER PUBLICATIONS

International Search Report of PCT/JP2017/022334 dated Aug. 29, 2017.
Extended European Search Report received in corresponding European Application No. 17830772.4 dated Jan. 24, 2020.

\* cited by examiner

AUTOMATIC ANALYSIS DEVICE AND AUTOMATIC ANALYSIS METHOD

TECHNICAL FIELD

The present disclosure relates to an automatic analysis device for clinical examination and an automatic analysis method.

BACKGROUND ART

An automatic analysis device for clinical examination is a device that optically detects a component amount of a desired component contained in a specimen such as blood or urine. In many cases, as a method of detecting the desired component contained in the specimen, an absorption photometric method for measuring a transmitted light amount of the specimen is used. In the absorption photometric method, a specimen or a reaction solution in which the specimen and a reagent are mixed is irradiated with light from a light source, absorbance is calculated by measuring the transmitted light amount of single or a plurality of wavelengths obtained as a result thereof, and a component amount of the desired component contained in the specimen is obtained from a relationship between the absorbance and the concentration according to the Lambert-Beer's law.

Two types of reactions, roughly classified into a color reaction using a reaction between a substrate and an enzyme and an agglutination reaction of an antigen and an antibody, are used for the reaction between the specimen and the reagent. The color reaction is a biochemical analysis, and the absorption amount (absorbance) of light by the color reaction solution is measured to obtain the component amount of the desired component in the specimen. The agglutination reaction is an immunoassay, and turbidness (turbidity) of the reaction solution which changes by the agglutination of the antigen and the antibody is measured from a change in transmitted light amount to obtain the component amount of the desired component in the specimen.

In general, the desired component (analyte) measured by immunoassay is low in blood concentration, and thus, a high sensitivity detection system is required. Therefore, in the immunoassay, there has been developed a latex immunoturbidimetric method and the like capable of performing high sensitive measurement by increasing a size of an agglutination mass generated by an antigen-antibody reaction using a reagent sensitized (bound) to a surface of a latex particle with an antibody or an antigen to increase a turbidity change.

As an automatic analysis device for clinical examinations, for example, as disclosed in PTL 1, there is known a device attempting to increase the sensitivity of immunoassay by using a change in light amount of scattered light of which a change in light amount is more easily grasped. In a scattering detection method utilizing a change in light amount of the scattered light, the agglutination mass generated by the antigen-antibody reaction is irradiated with light, the light amount scattered by the agglutination mass and/or the scattered light intensity is measured, and the component amount is obtained from the relationship between the light amount and/or the scattered light intensity and the concentration. However, in general, in the light scattering detection method, detection with high sensitivity can be performed with respect to a low concentration specimen, but with respect to a high concentration specimen, the number of agglutination masses produced increases, and thus, the quantitativeness becomes poor due to multiple scattering. On the other hand, the absorption photometric method has poor measurement sensitivity with respect to a low concentration specimen, but the quantitativeness is higher than that of the light scattering detection method with respect to a high concentration specimen, and the quantifiable concentration range is also wide. Therefore in recent years, an automatic analysis device has been developed which widens the dynamic range of measurement by including an absorption photometer and a light scattering photometer together in a single device and utilizing the difference in characteristics between the two photometers.

For example, PTL 2 and PTL 3 disclose an automatic analysis device in which an absorption photometer and a light scattering photometer are mounted together in the device. In these devices, the dynamic range is widened by selecting the light scattering photometer in the low concentration region and selecting the absorption photometer in the high concentration region. In particular, according to the method disclosed in PTL 3 that can measure immunoassay items (desired components in a specimen) in a wide concentration range using characteristics of a plurality of photometers, with respect to the selection criteria of photometers, disclosed is a method of selecting a photometer that can analyze with high sensitivity from variations of the measurement values of standard solutions used for preparing calibration curves of the photometers. In addition, disclosed is a method of switching between the absorption photometer and the light scattering photometer according to which one of a plurality of concentration ranges set in advance, which the measurement values of the photometers correspond to.

In addition, PTL 4 relates to a calibration curve used for obtaining a component amount of a desired component contained in a specimen and discloses a photometric assay in which simultaneously measures a reaction mixture obtained by reacting a specific analyte (a desired component in a specimen) in the specimen and an analyte-specific reaction partner (reagent) at a first wavelength optimized for a specific analyte at a low concentration and a second wavelength optimized for a specific analyte at a high concentration. In this photometric assay, an optical signal of one wavelength between the optical signals of the first and second wavelengths simultaneously measured is selected on the basis of a threshold value, and using a calibration curve corresponding to the selected optical signal between a first calibration curve recorded at the first wavelength and a second calibration curve recorded at the second wavelength, the amount of the specific analyte is quantified.

CITATION LIST

Patent Literature

PTL 1: International Publication No. 2011/004781
PTL 2: JP-A-2005-189245
PTL 3: JP-A-2014-6160
PTL 4: JP-T-2015-515006

SUMMARY OF INVENTION

Technical Problem

In the automatic analysis device disclosed in PTL 3, a method of selecting each of the absorption photometer and the light scattering photometer is illustrated. As a selection method therefore, a method of selecting a photometer capable of performing a highly sensitive analysis from variations of the measurement values of a standard solution used for preparing a calibration curve of each photometer or a method of dividing a concentration of a desired component contained in a specimen calculated by the absorption photometer roughly into three concentration ranges of a low concentration, a medium concentration, and a high concentration and selecting the photometer set corresponding to each concentration range is disclosed.

However, in the selection of the photometer described above, details of the method of checking the photometer capable of performing highly sensitive analysis and details of the method of setting the concentration range that is the criterion when selecting the photometer have been unclear, and the method of selecting a specific photometer and the selection criterion for this method have not been considered.

For example, with regard to the checking of the photometer with high sensitivity, when the widths of variations in the measurement values of the absorption photometer and the light scattering photometer represent the same value, or the photometer where the width of variation in the measurement value is large or small vibrates in accordance with the measurement value (component amount) of the concentration of the desired component between the absorption photometer and the light scattering photometer (the two photometers are switched alternatingly), the selection method has not been considered. With respect to the setting of the concentration range, the concentration range requiring switching between the absorption photometer and the light scattering photometer and the method of determining the concentration range have not been considered.

Furthermore, in the automatic analysis device disclosed in PTL 3, in relation to the method of checking the photometer and the selection criterion described above, a problem that the concentration calculated by each of the absorption photometer and the light scattering photometer is out of the selection range or within the selection range for each photometer, whereby a selection error of the photometer occurs, has not been considered.

On the other hand, also in a case of the automatic analysis device disclosed in PTL 4, a specific method of determining the threshold value itself of the optical signal configured with one point, which is used in the selection of the calibration curve, is not disclosed, and the method has been unclear. In addition, similarly to the case of the automatic analysis device disclosed in PTL 3, a problem that the concentration of a specific analyte (a desired component in a specimen) calculated at each of the first wavelength and the second wavelength is out of the selection range or within the selection range of any one of the first wavelength and the second wavelength, whereby a selection error in the first wavelength and the second wavelength occurs, has not been considered.

The present disclosure relates to an automatic analysis device equipped with an absorption photometer and a light scattering photometer and is to provide the automatic analysis device and an automatic analysis method contributing to high precision and high speed analysis by preventing a selection error that makes it impossible to select a photometer from occurring when determining a concentration of a desired component for various specimens.

Solution to Problem

The present disclosure provides an automatic analysis device including a plurality of types of photometers for detecting light from a light source irradiated to a reaction vessel, and when setting a concentration range of a desired component that quantification can be performed by each of the photometers, a switching region in which quantification of the desired component can be performed in any of the plurality of types of photometers and which is included in a concentration range of the desired component where calibration curves of the photometers overlap with each other is set. The photometer or the quantitative result of the desired component used for quantitative output of the desired component is selected according to a determination result as to whether or not to be included in the switching region for each quantitative result of the desired component by a plurality of types of photometers.

Advantageous Effects of Invention

According to the present disclosure, it is possible to accurately perform switching selection between an absorption photometer and a light scattering photometer without causing a selection error of the photometer and to execute measurement of a component amount of a desired component contained in a specimen with high accuracy and high speed.

In addition, problems, configurations, and effects of the present disclosure other than those described above will be clarified by the following description of the embodiments.

DESCRIPTION OF EMBODIMENTS

Hereinafter, embodiments of an automatic analysis device and an automatic analysis method according to the present disclosure will be described with reference to the drawings.

Figure 1:
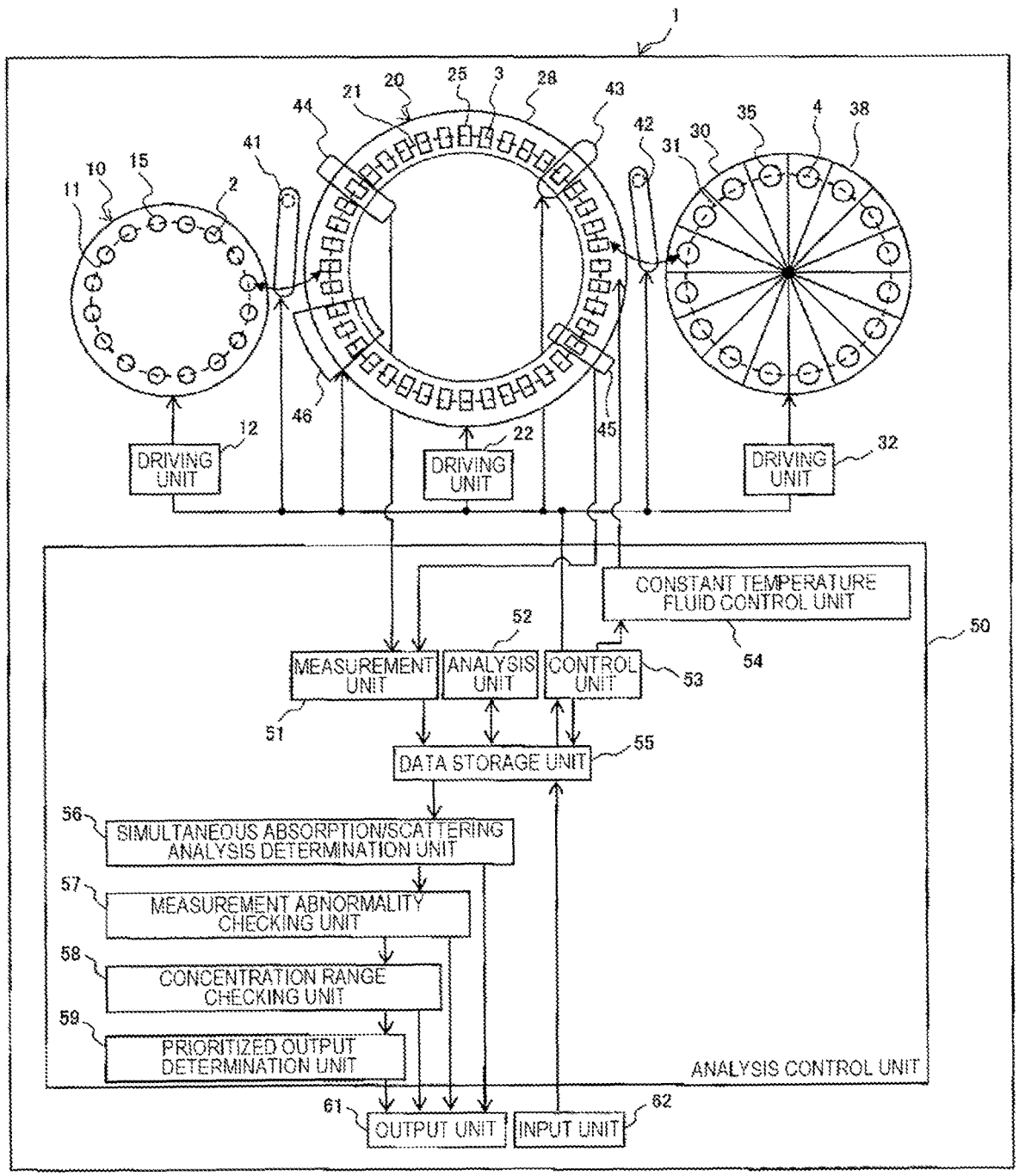
FIG. 1 is a schematic overall configuration diagram of an embodiment of an automatic analysis device according to the present disclosure.

FIG. 1 is a schematic overall configuration diagram of an embodiment of the automatic analysis device according to the present disclosure.

An automatic analysis device 1 according to this embodiment includes a specimen disk 10, a reaction disk 20, a reagent disk 30, a specimen dispensing mechanism 41, a reagent dispensing mechanism 42, an analysis control unit 50, an output unit 61, and an input unit 62.

On the specimen disk 10, a plurality of specimen cups 15 as specimen containers for accommodating specimens 2 are mounted. Each of the specimen cups 15 is arranged and retained in parallel on the disk main body 11 of the specimen disk 10 to be spaced apart from each other along the circumferential direction of the disk. The specimen disk 10 is provided with a driving unit 12 which rotates the disk main body 11 to move and displace the plurality of specimen cups 15 along the circumferential direction of the disk. By driving control of the driving unit 12, the specimen disk 10 can arrange one specimen cup 15 out of the plurality of specimen cups 15 mounted on the disk main body 11 at, for example, a predetermined position along the circumferential direction of the disk, which is called a specimen suction position.

In addition, in FIG. 1, illustrated is an example of the specimen disk 10 where the plurality of specimen cups 15 are arranged in a line along the circumferential direction of the disk on the disk main body 11, but the plurality of the specimen cups may be arranged in a plurality of rows concentrically. Furthermore, the configuration for retaining the plurality of specimen cups 15 is not limited to the specimen disk 10, but the configuration may be a rack type using a specimen rack in which specimen containers are arranged and retained one-dimensionally or two-dimensionally.

The reaction disk 20 is provided adjacent to the specimen disk 10, and a plurality of reaction vessels 25 where the reaction solution 3 is produced are retained in the disk main body 21. The reaction vessels 25 are arranged and retained in parallel on the disk main body 21 while being spaced apart from each other along the circumferential direction of the disk. Each of the reaction vessels 25 is configured with a translucent material for measurement by an absorption photometer 44 and a light scattering photometer 45 to be described later. The reaction disk 20 is provided with a driving unit 22 that rotates the disk main body 21 to move and displace the plurality of reaction vessels 25 along the circumferential direction of the disk.

With respect to the reaction disk 20, the disk main body 21 is rotationally controlled by driving control of the driving unit 22, and one reaction vessel 25 out of the mounted plurality of reaction vessels 25 can be moved and arranged, for example, at a predetermined position provided along the circumferential direction of the disk such as a specimen ejection position by the specimen dispensing mechanism 41, a reagent ejection position by the reagent dispensing mechanism 42, and the like.

In addition, a thermostatic bath 28 is provided in the reaction disk 20. The plurality of reaction vessels 25 respectively arranged on the disk main body 21 are always immersed in thermostatic bath water (constant temperature fluid) in the thermostatic bath 28, and the reaction solution 3 in the container is maintained at a constant reaction temperature (for example, about 37° C.). The temperature and flow rate of the thermostatic bath water (constant temperature fluid) in the thermostatic bath 28 are controlled by a later-described constant temperature fluid control unit 54 of the analysis control unit 50, and the amount of heat supplied to the reaction vessel 25 is controlled.

In addition to the specimen dispensing mechanism 41 and the reagent dispensing mechanism. 42, the stirring unit 43, the absorption photometer 44, the light scattering photometer 45, the washing unit 46 are arranged along the circumference of the reaction disk 20.

The stirring unit 43 stirs the reaction solution 3 made of a mixed solution of the specimen 2 and the reagent 4 dispensed into the reaction vessel 25 by the specimen dispensing mechanism 41 and the reagent dispensing mechanism 42, respectively. As a result, the reaction solution 3 in the reaction vessel 25 is uniformly stirred, and the reaction is accelerated. The stirring unit 43 is provided with, for example, a stirrer having stirring blades or a stirring mechanism using ultrasonic waves.

In the illustrated example, the absorption photometer 44 and the light scattering photometer 45 are arranged along the circumference of the reaction disk 20 to be positioned on a diagonal line passing through the rotation center of the reaction disk 20 with the reaction disk 20 interposed therebetween. Any one of the absorption photometer 44 and the light scattering photometer 45 has a structure including a light source and a light reception unit. When the reaction solution is irradiated with light from the light source, in the absorption photometer 44, the transmitted light obtained from the reaction solution is detected by the light reception unit, and the transmitted light amount of single wavelength or a plurality of wavelengths is measured. When the reaction solution is irradiated with light from the light source, in the light scattering photometer 45, the scattered light obtained from the reaction solution is detected by the light reception unit, and the amount of light scattered by the reaction solution and/or the scattered light intensity is measured.

The washing unit 46 discharges the remaining reaction solution 3 from the reaction vessel 25 after the analysis and cleans the reaction vessel 25. The next specimen 2 is again dispensed from the specimen dispensing mechanism 41 to the washed reaction vessel 25, and the reagent 4 used for quantification of the analysis item (desired component) set corresponding to the specimen 2 is dispensed from the reagent dispensing mechanism 42 is dispensed.

The reagent disk 30 is provided adjacent to the reaction disk 20, and a plurality of reagent bottles 35 for containing the reagent 4 are mounted on the disk main body 31. In the reagent bottles 35, reagents corresponding to desired components (analysis items) analyzed by the automatic analysis device 1 are separately stored by changing bottles for respective types of the reagents. The reagent bottles 35 are arranged and retained in parallel on the disk main body 31 while being spaced apart from each other along the circumferential direction of the disk.

The reagent disk 30 is provided with a driving unit 32 that rotates the disk main body 31 to move and displace the plurality of reagent bottles 35 along the circumferential direction of the disk. With respect to the reagent disk 30, by driving control of the driving unit 32, a predetermined reagent bottle 35 used for measurement out of the plurality of reagent bottles 35 mounted on the disk main body 31 can be arranged a predetermined position along the circumferential direction of the disk such as the reagent suction position.

In addition, a reagent refrigerator 38 including a cooling mechanism is provided on the reagent disk 30. Even when the disk main body 31 rotates, the plurality of reagent bottles 35 respectively arranged on the disk main body 31 are cooled in the state of being constantly retained in the cooling environment of the reagent refrigerator 38, so that deterioration of the reagent 4 is prevented. As the cooling mechanism provided in the reagent refrigerator 38, for example, a method of circulating low-temperature water to a cooling tank in which the reaction vessel 25 is immersed, a method of cooling in a gas phase with a Peltier element, or the like is used.

The specimen dispensing mechanism 41 is provided between the specimen disk 10 and the reaction disk 20 and includes a movable arm and a dispensing nozzle including a pipette nozzle attached to the movable arm. The specimen dispensing mechanism 41 moves the dispensing nozzle to the specimen suction position on the specimen disk 10 and, sucks and accommodates a predetermined amount of the specimen in the nozzle from the specimen cup 15 arranged at the specimen suction position. After that, the specimen dispensing mechanism 41 moves the dispensing nozzle to the specimen ejection position on the reaction disk 20, ejects the specimen retained in the nozzle into the reaction vessel 25 arranged at the specimen ejection position, and performs the specimen dispensing.

The reagent dispensing mechanism 42 is installed between the reaction disk 20 and the reagent disk 30 and, similarly, has a movable arm and a dispensing nozzle. The reagent dispensing mechanism 42 moves the dispensing nozzle to the reagent suction position on the reagent disk 30 and sucks and accommodates a predetermined amount of reagent into the nozzle from the reagent bottle 35 arranged at the reagent suction position. After that, the reagent dispensing mechanism 42 moves the dispensing nozzle to the reagent ejection position on the reaction disk 20, ejects the reagent contained in the nozzle into the reaction vessel 25 arranged at the reagent ejection position, and performs dispensing of the reagent.

The specimen dispensing mechanism 41 and the reagent dispensing mechanism 42 are provided with respective washing tanks for washing the dispensing nozzles that have completed dispensing in preparation for dispensing different types of specimens or reagents into the reaction vessels 25. Each of the dispensing nozzles is washed in the washing tank before and after the dispensing operation of the specimens or the reagents, so that contamination between the specimens or between the reagents is prevented.

The analysis control unit 50 includes a measurement unit 51, an analysis unit 52, a control unit 53, a constant temperature fluid control unit 54, a data storage unit 55, an simultaneous absorption/scattering analysis determination unit 56, a measurement abnormality checking unit 57, a concentration range checking unit 58, and a prioritized output determination unit 59.

From the measurement value of the transmitted light amount obtained from the absorption photometer 44, the measurement unit 51 obtains the light amount of the transmitted light and/or the transmitted light intensity (hereinafter, the light amount of the transmitted light and/or the transmitted light amount is collectively referred as transmitted light intensity) by the reaction solution 3, from which the measurement value is acquired. In addition, from the measurement values of the scattered light amount and/or the scattered light intensity obtained from the light scattering photometer 45, the measurement unit 51 obtains the light amount of the scattered light and/or the scattered light intensity (hereinafter, the light amount of the scattered light and/or the scattered light intensity is collectively referred to as scattered light intensity) by the reaction solution 3, from which the measurement value is acquired. The transmitted light intensity and the scattered light intensity obtained by the measurement unit 51 are stored in the data storage unit 55 in association with the reaction vessel 25 from which the measurement value is acquired or the analysis request in which the reaction vessel 25 is used. In addition, the analysis request includes information on the specimen 2, the reagent 4, and the like used in the analysis.

The analysis unit 52 reads out the transmitted light intensity and/or the scattered light intensity of the predetermined reaction solution 3 measured by the measurement unit 51 and analyzes the desired component in the reaction solution 3. The analyzed data from the analysis are stored in the data storage unit 55 by the analysis unit 52, in association with the reaction vessel 25 from which the measurement value is acquired or the analysis request of the specimen 2 in which the reaction vessel 25 is used.

More specifically, the analysis unit 52 calculates the component concentration (component amount) of the desired component in the predetermined reaction solution 3 from the transmitted light intensity and/or the scattered light intensity of the predetermined reaction solution 3 obtained by the measurement unit 51 with reference to the calibration curve corresponding to the reagent 4 used for the predetermined reaction solution 3. The calibration curve illustrates the relationship between the component concentration of the desired component and the transmitted light intensity and/or scattered light intensity, which are obtained using a specimen such as a standard substance containing a desired component having a known concentration. The calibration curve data of each reagent contained in the reagent bottle 35 and mounted on the reagent disk 30 is stored in advance in the data storage unit 55.

Furthermore, when calculating the component concentration of the desired component in the reaction solution 3, the analysis unit 52 reads out, from the data storage unit 55, the control result data of the mechanism relating to the analysis of the predetermined reaction solution 3 such as the specimen dispensing mechanism 41 and the reagent dispensing mechanism 42 in addition to the measurement data such as the transmitted light intensity and/or the scattered light intensity of the predetermined reaction solution 3 obtained by the measurement unit 51 and checks whether or not an abnormality has occurred in the measurement data and the controlling of the mechanism.

Then, when it is checked that the abnormality has occurred in the measurement data or the control of the mechanism, the analysis unit 52 adds an error (for example, a technical limit error, a specimen insufficient error, and the like) to the component concentration of the desired component calculated on the basis of the transmitted light intensity and/or the scattered light intensity of the predetermined reaction solution 3 and stores the data in the data storage unit 55 in association with the reaction vessel 25 from which the measurement value was acquired or the analysis request of the specimen 2 using the reaction vessel 25.

In addition, the analysis unit 52 outputs the calculated component concentration of the desired component to the later-described simultaneous absorption/scattering analysis determination unit 56 and outputs and displays the calculated component concentration of the desired component to the output unit 61 configured by a display or the like through the simultaneous absorption/scattering analysis determination unit 56 or, if necessary, furthermore, appropriately through the measurement abnormality checking unit 57, the concentration range checking unit 58, and the prioritized output determination unit 59.

On the basis of the analysis request of each of the specimens 2 stored in the data storage unit 55, the control unit 53 controls the driving units 12, 22, and 32 to rotatably drive the specimen disk 10, the reaction disk 20, and the reagent disk 30. In addition, the control unit 53 controls the dispensing operation by the specimen dispensing mechanism 41 and the reagent dispensing mechanism 42.

The control unit 53 adjusts the specimen cup 5, the reaction vessel 25, and the reagent bottle 35 arranged at the specified positions of the corresponding disks by rotating the specimen disk 10, the reaction disk 20, and the reagent disk 30, respectively. In this case, the specimen suction position by the specimen dispensing mechanism 41 is included in the specified position of the specimen disk 10. In addition, the specified position of the reaction disk 20 includes a specimen ejection position by the specimen dispensing mechanism 41, a reagent ejection position by the reagent dispensing mechanism 42, a stirring position by the stirring unit 43, a measurement position by the absorption photometer 44, a measurement position by the light scattering photometer 45, and a washing position by the washing unit 46. In addition, the specified position of the reagent disk 30 includes the reagent suction position by the reagent dispensing mechanism 42.

The control unit 53 controls the rotation of each of the specimen disk 10, the reaction disk 20, and the reagent disk 30 in this manner and controls the dispensing operation by the specimen dispensing mechanism 41 and the reagent dispensing mechanism 42 to produce a predetermined reaction solution 3 on the basis of the analysis request of each of the specimens 2 for each of the plurality of reaction vessels 25 retained on the reaction disk 20 and to execute the measurement of the transmitted light intensity and/or the scattered light intensity of the produced predetermined reaction solution 3.

The constant temperature fluid control unit 54 controls the temperature and the flow rate of the thermostatic bath water (constant temperature fluid) in the thermostatic bath 28 provided in the reaction disk 20 to adjust the temperature of the reaction solution 3 in the reaction vessel 25.

The measurement unit 51, the analysis unit 52, the control unit 53, the constant temperature fluid control unit 54, the simultaneous absorption/scattering analysis determination unit 56, the measurement abnormality checking unit 57, the concentration range checking unit 58, the prioritized output determination unit 59 in the analysis control unit 50 are integrally configured by a microprocessor such as a CPU, for example. In this case, the microprocessor reads out and executes the corresponding processing program of each of the constituent units 51 to 59 from a predetermined storage region of the data storage unit 55 configured with a ROM, a RAM, or the like to perform operation control of each of the constituent units of the above-described device for obtaining the analysis result or processing control of the measurement data.

The automatic analysis device 1 according to this embodiment is configured such that the analysis items of the specimen (desired components of the specimen 2) can be simultaneously analyzed by the absorption photometer 44 and the light scattering photometer 45 and the reaction process of the reaction solution 3 can be measured by the absorption photometer 44 and/or the light scattering photometer 45.

In this case, in the automatic analysis device 1 according to the embodiment, when the specimen 2 or the desired component of the specimen 2 has a high concentration, the concentration calculated from the measurement value of the absorption photometer 44 can be output from the output unit 61 as the analysis result, and when the specimen 2 or the desired component of the specimen 2 has a low concentration, the concentration calculated from the measurement value of the light scattering photometer 45 can be output from the output unit 61 as the analysis result, so that it is possible to perform the measurement with a wide dynamic range.

Next, in the automatic analysis device 1 according to the embodiment configured in this manner, when performing measurement by the light scattering photometer 45 and the absorption photometer 44 respectively, the setting of the analysis parameters referred to by the respective constituent units 51 to 59 of the analysis control unit 50 and the concentration output executed by the analysis control unit 50 in accordance with the set parameters will be described separately for each item.

(1) Analysis Parameter Setting

Figure 2:
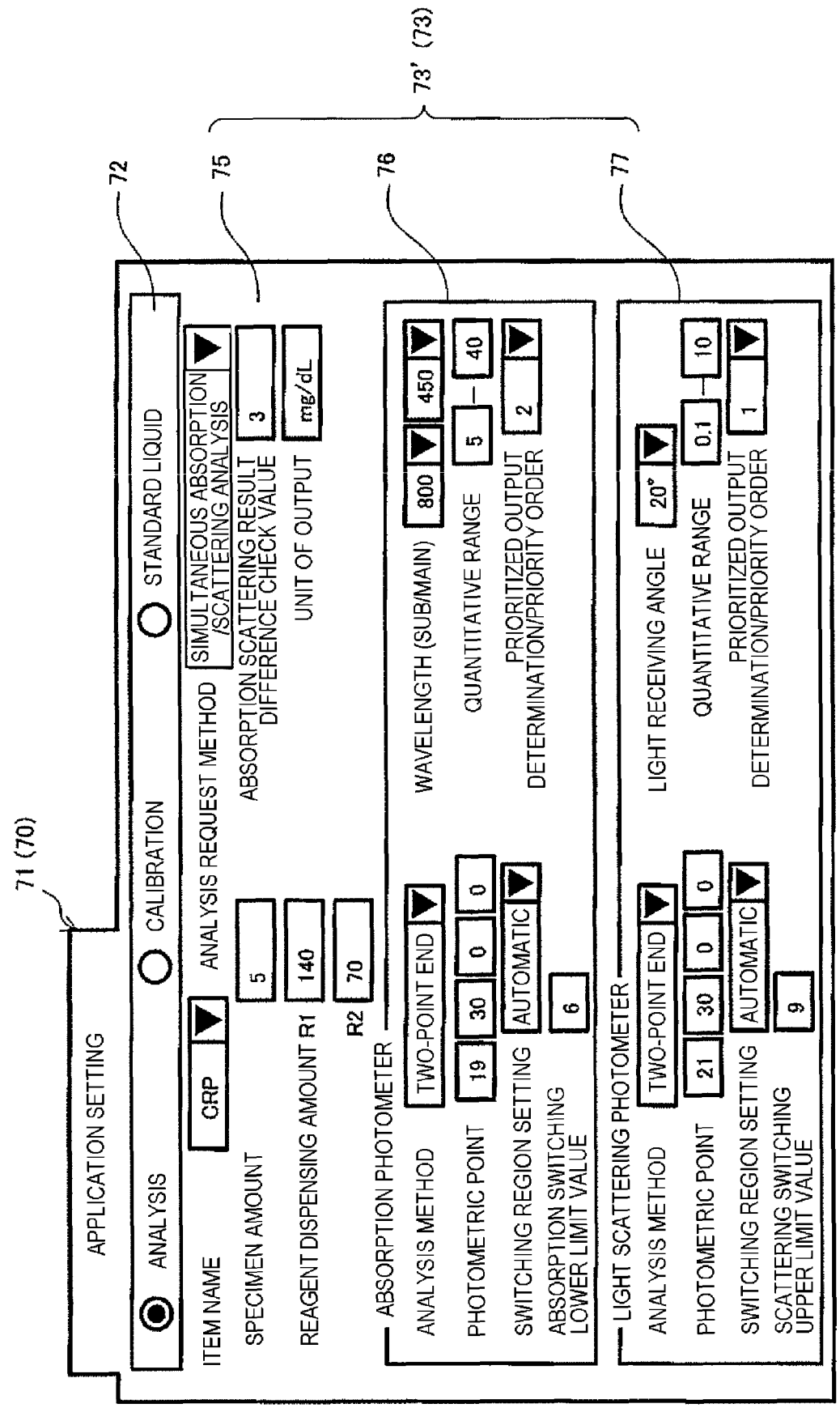
FIG. 2 is a configuration diagram of an embodiment of an operation unit for setting analysis parameters in the automatic analysis device of the embodiment.

FIG. 2 is a configuration diagram of an embodiment of an operation unit for setting the analysis parameters in the automatic analysis device according to this embodiment.

In the automatic analysis device 1 according to the embodiment, the operation unit 70 for setting analysis parameters is configured to have an application setting screen 71 as a GUI. The application setting screen 71 is displayed on a display device such as a display included in the output unit 61 by predetermined operations of an operation device such as a keyboard and a mouse included in the input unit 62. The setting and inputting of the analysis parameters can be performed through the input unit 62 on the application setting screen 71.

The application setting screen 71 includes an item selection field 72 for application settings and a parameter setting field 73 for each selected item. In the illustrated example, a state is illustrated in which "analysis" is selected in the item selection field 72, and a parameter setting field 73' for setting analysis parameters is displayed in the parameter setting field 73.

In the screen configuration, the parameter setting field 73' for setting analysis parameters is divided into a photometer common setting field 75 for setting and inputting analysis parameters common to the absorption photometer 44 and the light scattering photometer 45, an absorption photometer dedicated setting field 76 for setting and inputting analysis parameters of only the absorption photometer 44, and a light scattering photometer dedicated setting field 77 for setting and inputting analysis parameters of only the light scattering photometer 45.

In FIG. 2, a state is exemplified where, in the photometer common setting field 75, in the pull-down menu, "CRP (C-reactive protein)" is selected as the "item name" representing the type of the analysis item, and "simultaneous absorption/scattering analysis" is selected as the type of the "analysis request method", respectively. Then, a state is exemplified where "5 [µl]" is set as "specimen amount", a first reagent "R1" is set as the "reagent dispensing amount", "140 µl" and "70 µl" are set as a second reagent "R2", a component amount "3" is set as "absorption/scattering result difference check value", and "mg/dl" is set as "unit of output" of the component amount.

Herein, the "simultaneous absorption/scattering analysis" as a type of the "analysis request method" indicates execution setting of the analysis method in which the dynamic range of the desired component is widened by switching to select the light scattering photometer in a low concentration region and select the absorption photometer in a high concentration region and by simultaneously using the absorption photometer and the light scattering photometer having different characteristics.

In addition, in the absorption photometer dedicated setting field 76, a state is exemplified where, "two-point end", that is, a method of obtaining a concentration of a desired component from two measurement values of a measurement value before the reaction or immediately after the reaction is set as the type of "analysis method", and "800/450 [nm]" is set as the main/sub wavelength of the two-wavelength photometry as the "measurement wavelength". Then, a state is exemplified where, "19" and "30" is selected or set as the "photometric point", "5 to 40" of the component amount (measurement value of the concentration of the desired component) is selected or set as the "quantitative range" by the absorption photometer 44, "automatic" as the "switching region setting", "2" as the "prioritized output determination/priority order", and "6" as the component amount of "light absorption switching lower limit value". In addition, as for the type of analysis method, besides this "two-point end", for example, "one-point end" using the measurement value at the end of the reaction by the same end point method or a "rate method" of obtaining the concentration of the substance by measuring the reaction rate can be selected by a pull-down menu method.

In addition, in the light scattering photometer dedicated setting field 77, a state is exemplified where "two-point end" is set as the type of the "analysis method" and "20°" is set as the "light receiving angle". Then, a state is exemplified where "21" and "30" are selected or input and set as the "photometric point", "0.1 to 10" of the component amount as the "quantitative range" by the light scattering photometer 45, "automatic" as the "switching region setting", "1" as the "prioritized output determination/priority order", and a component amount "9" as the "scattering switching upper limit value".

In FIG. 2, since the "simultaneous absorption/scattering analysis" is selected as the classification request method in the photometer common setting field 75, the absorption photometer dedicated setting field 76 and the light scattering photometer dedicated setting field 77 are displayed on the application setting screen 71, but when the "absorption analysis" or the "scattered light analysis" is selected as the classification request method, the light scattering photometer dedicated setting field 77 or the absorption photometer dedicated setting field 76 related to the light scattering photometer 45 or the absorption photometer 44 which is not used for the analysis may not be displayed.

In addition, as illustrated in FIG. 2, in a case where the "simultaneous absorption/scattering analysis" is selected as the classification request method in the photometer common setting field 75, in the "prioritized output determination/priority order" of each of the absorption photometer dedicated setting field 76 and the light scattering photometer dedicated setting field 77, if the prioritized output priority (for example, "1") is set in the one dedicated setting field 76 (or 77), a complementary prioritized output priority (for example, "2") is automatically input and set in the other dedicated setting field 77 (or 76) on the basis of one of the prioritized output priorities (for example, "1") set previously.

Next, with reference to the calibration curves L1 and L2 of the transmitted light intensity and the scattered light intensity applied to the quantification of the desired component according to the absorption photometer 44 and the light scattering photometer 45 in the automatic analysis device 1 according to the embodiment, the "quantitative range" and the "switching region setting" set in the absorption photometer dedicated setting field 76 and the light scattering photometer dedicated setting field 77 illustrated in FIG. 2, the "absorption switching lower limit value" set in the absorption photometer dedicated setting field 76, and the "scattering switching upper limit value" set in the light scattering photometer dedicated setting field 77 will be described.

Figure 3:
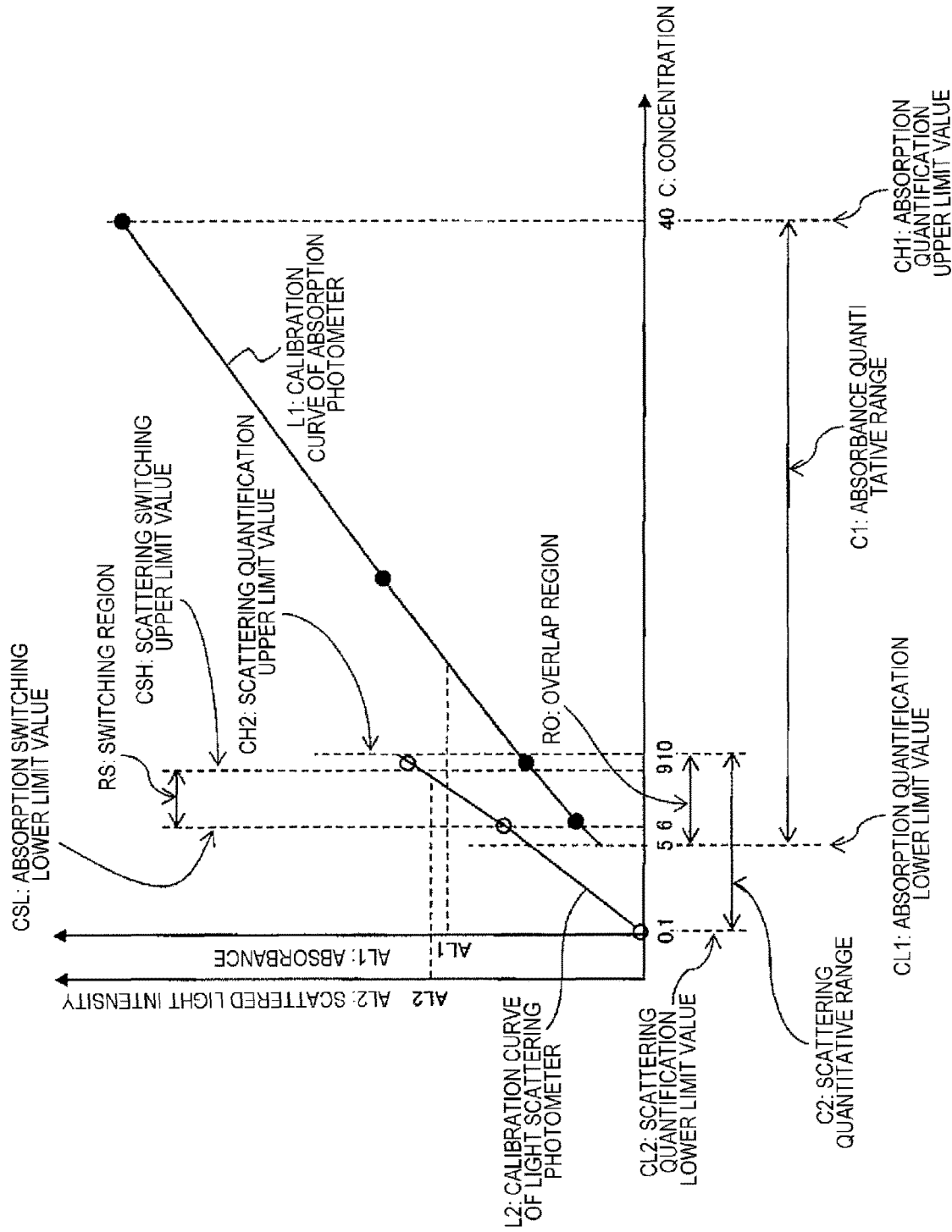
FIG. 3 is a graph schematically illustrating a calibration curve using a transmitted light intensity and a scattered light intensity applied in the automatic analysis device of the embodiment.

FIG. 3 is a graph schematically illustrating a calibration curve using transmitted light intensity and scattered light intensity applied in the automatic analysis device according to the embodiment. In FIG. 3, the calibration curves L1 and L2 of the transmitted light intensity and the scattered light intensity are schematically illustrated on the graph obtained by taking the horizontal axis representing the concentration (for example, [ng/ml], [μg/ml], [mg/dl] is applied as the unit) and the vertical axis representing the absorbance (for example, [Abs.] is applied as the unit) or the scattered light intensity (for example, [count] is applied as the unit).

In the case of the automatic analysis device 1 according to the embodiment, as illustrated in FIG. 3, the quantitative ranges are as follows.

Quantitative range C1 of absorption photometer 44: 5 to 40

Quantitative range C2 of light scattering photometer 45: 0.1 to 10

Accordingly, the quantification lower limit value CL1 "5" of the quantitative range C1 "5 to 40" of the absorption photometer 44 is included in the quantitative range C2 "0.1 to 10" of the light scattering photometer 45, and similarly, the quantification upper limit value CH2 "10" of the quantitative range C2 "0.1 to 10" of the light scattering photometer 45 is included in the quantitative range C1 "5 to 40" of the absorption photometer 44. Along with this, between the calibration curve L1 of the quantitative range C1 "5 to 40" of the absorption photometer 44 and the calibration curve L2 of the quantitative range C2 "0.1 to 10" of the light scattering photometer 45, an overlap region RO of the concentration region defined by the quantification lower limit value CL1 "5" of the absorption photometer 44 and the quantification upper limit value CH2 "10" of the light scattering photometer 45 is formed.

In addition, in the embodiment, the switching region RS of the photometer between the absorption photometer 44 and the light scattering photometer 45, defined by the light absorption switching lower limit value CSL "6" set in the absorption photometer dedicated setting field 76 and the scattering switching upper limit value CSH "9" set in the light scattering photometer dedicated setting field 77 is set.

The characteristics of the analysis parameters in the automatic analysis device 1 according to the embodiment, (a) the overlap region RO, (b) the switching region RS, (c) the prioritized output priority and (d) the setting of the absorption/scattering result difference check will be described.

(A) Setting of Overlap Region RO

The overlap region RO (RO: 5 to 10) of the quantitative ranges C2 and C1 (C2: 0.1 to 10 and C1: 5 to 40) of the light scattering photometer 45 and the absorption photometer 44 capable of performing simultaneous measurement is set by the input of the quantitative range (scattering quantitative range) C2 of the light scattering photometer 45 by the light scattering photometer dedicated setting field 77 and the input of the quantitative range (absorbance quantitative range) C1 of the absorption photometer 44 by the absorption photometer dedicated setting field 76 in the state where the "simultaneous absorption/scattering analysis" is selected as the classification request method in the photometer common setting field 75. At that time, the concentration width "5" of the overlap region RO is set to a width that is sufficiently wide as compared with the width of the variation of the concentration of the desired component due to the variations of the respective measurement values AL1 and AL2 of the transmitted light intensity and the scattered light intensity by the light scattering photometer 45 and the absorption photometer 44.

For example, when the concentration width of the overlap region RO is set to "0", that is, the quantification lower limit value CL1 of the absorption photometer 44 and the quantification upper limit value CH2 of the light scattering photometer 45 are set to the same concentration C (for example, C=CL1=CH2=7), the concentration (C=7) as one point becomes the single switching threshold value Cs of the photometers 44 and 45.

When such the concentration C (=7) of one point is set as the threshold value Cs, the concentration C is calculated using the absorption photometer 44 for the specimen 2 having the concentration C (7≤C) equal to or higher than the threshold value Cs, and the concentration C is calculated using the light scattering photometer 45 for the specimen 2 having a concentration C (C<7) lower than the threshold value Cs. However, when the specimen 2 having the concentration C in the vicinity of the switching threshold value Cs (=7) is measured, in the alternative selection of the photometers 44, 45 on the basis of the switching threshold value Cs, there is a possibility of the occurrence of the photometer selection error. In addition, two different measured concentrations may be acquired from the two types of the absorption photometer 44 and the light scattering photometer 45, respectively.

In the case of measuring the specimen 2 having the concentration C in the vicinity of the threshold value Cs (=7), in some cases, from the variation of the measurement value AL, the concentration C (for example, C=6.9) lower than the threshold value Cs (=7) may be calculated in the absorption photometer 44, and the concentration C (for example, C=7.1) higher than the threshold value Cs (=7) may be calculated in the light scattering photometer 45. At this time, if the concentration width of the overlap region RO is set to "0", both are out of the quantitative range with reference to the threshold value Cs (=7). This is because the quantitative range with reference to the threshold value Cs (=7) of the absorption photometer 44 is "7 to 40", and the quantitative range with reference to the threshold value Cs (=7) of the light scattering photometer 45 is "0.1 to 7". As a result, although both the concentrations C (absorption photometer: Ca=6.9 and light scattering photometer: Cb=7.1) are also normally measured within the original quantitative ranges (absorption photometer: 5 to 40 and light scattering photometer: 0.1 to 10) of the absorption photometer 44 and the light scattering photometer 45, the concentration width of the overlap region RO becomes "0", whereby the calculated concentrations C (absorption photometer: Ca=6.9 and light scattering photometer: Cb=7.1) of both photometers are out of the quantitative range, so that the measurement error is output.

On the contrary, when any one of the calculated concentrations C (absorption photometer: Ca=7.1 and light scattering photometer: Cb=6.9) becomes the quantitative range (absorption photometer: 7 to 40 and light scattering photometer: 0.1 to 7) with reference to the threshold value Cs (=7) due to the variation of the measurement value AL by the absorption photometer 44 and the light scattering photometer 45, two different calculated concentrations C (absorption photometer: Ca=7.1 and light scattering photometer: Cb=6.9) are acquired with respect to one specimen 2.

In order to avoid occurrence of such a situation, in the automatic analysis device 1 according to the embodiment, a reagent having a sufficiently wide concentration width of the overlap region RO in comparison with the width of the variation of the concentration of the desired component due to the variation of the measurement values AL of the absorption photometer 44 and the light scattering photometer 45 is used as the reagent 4.

For example, if the quantitative ranges C1 and C2 of the respective types of the photometers are determined for each lot of the reagent 4 by a preliminary test or the like and information on the quantitative ranges C1 and C2 and the overlap region RO is acquired, the user may set the analysis parameters such as the quantification lower limit value CL1 of the absorption photometer 44 and the quantification upper limit value CH2 of the light scattering photometer 45 for switching a plurality of types of the photometers on the basis of the acquired information on the quantitative ranges C1 and C2 and the overlap region RO. Furthermore, the concentration range that does not cause problems even if the concentration range is used for quantification due to the performance of the device 1 and the reagent 4 is set in consideration of the accuracy and precision required at the clinical site. In addition, a manual setting method or an automatic setting method using a device may be considered with respect to the analysis parameters for switching between a plurality of types of photometers, such as the quantification lower limit value CL1 and the quantification upper limit value CH2. However, in order to secure the reliability of the concentration data of the analysis result, by using the information on the quantitative ranges C1 and C2 and the overlap region RO for each type of reagent 4 acquired by a preliminary test and the like, it is possible to easily set the analysis parameter for switching between the plurality of types of photometers in comparison with the manual setting method of the automatic setting method using the device.

The quantitative ranges C1 and C2 of the each photometer (absorption photometer 44 and light scattering photometer 45) are determined in consideration of, for example, (a1) a variation of the measurement values AL1 and AL2, (a2) linearity of the calibration curves CL1 and CL2, and (a3) a deviation between the output values of the absorption photometer 44 and the light scattering photometer 45, and the like.

(A1) Variation of Measurement Value AL

The variation of the measurement value AL is obtained by checking the variations of the measurement value AL1 of the transmitted light intensity and the measurement value AL2 of the scattered light intensity when the same specimen is measured a plurality of times by the absorption photometer 44 and the light scattering photometer 45. That is, the concentration range of each of the absorption photometer 44 and the light scattering photometer 45 is set so that the variation of the measurement value AL required at the clinical site is equal to or less than the allowable value.

(A2) Linearity of Calibration Curves L1 and L2

With respect to the linearity of the calibration curves L1 and L2, the standard substances at a plurality of concentrations are measured by the absorption photometer 44 and the light scattering photometer 45. The concentration C of the standard substance is plotted on the horizontal axis (x-axis), and the transmitted light intensity AL1 measured by the absorption photometer 44 or the scattered light intensity AL2 measured by the light scattering photometer 45 is plotted on the vertical axis (y-axis). Then, the concentration ranges of the absorption photometer 44 and the light scattering photometer 45, in which the slope of the graphs of the transmitted light intensity AL1 and the scattered light intensity AL2 are within the allowable values, are set.

(A3) Deviation of Concentration Output Value Between Absorption Photometer 44 and Light Scattering Photometer 45

In the high concentration region of the light scattering photometer 45, the scattered light intensity change amount with respect to the concentration change amount decreases due to multiple scattering, and thus, there is a possibility that a concentration lower than an actual concentration is output. For this reason, the quantification upper limit value CH2 by the light scattering photometer 45 is set to a concentration having a small deviation of the output concentration between the absorption photometer 44 and the light scattering photometer 45.

In consideration of the factors as described above, the quantitative ranges C1 and C2 of the absorption photometer 44 and the light scattering photometer 45, and the overlap region RO of the quantitative ranges C1 and C2 between the absorption photometer 44 and the light scattering photometer 45 are determined.

(B) Setting of Switching Region RS

The overlap region RO of the quantitative ranges C1 and C2 between the absorption photometer 44 and the light scattering photometer 45 is a concentration range of the specimen that can be quantified by each photometer and is defined by the quantification upper limit value CH2 of the light scattering photometer 45 ("10" in a case where the quantitative range C2 is "0.1 to 10") and the quantification lower limit value CL1 of the absorption photometer 44 ("5" in a case where the quantitative range C1 is "5 to 40").

With respect to such an overlap region RO, the switching region RS is a concentration region of the same specimen in which the variations of the measurement values of the respective photometers between the light scattering photometer 45 and the absorption photometer 44 are approximately the same and is defined by the switching upper limit value CSH of the light scattering photometer 45 and the switching lower limit value CSL of the absorption photometer 44.

If it has been found that there is a clear difference in variations of the measurement values AL1 and AL2 of the photometers between the absorption photometer 44 and the light scattering photometer 45 in the overlap region RO by a preliminary test or the like, apart from the quantitative ranges C1 and C2, it is not necessary to further set the switching upper limit value CSH of the light scattering photometer 45 and the switching lower limit value CSL of the absorption photometer 44. For example, when the variation of the measurement value of the other photometer is small over the entire region of the overlap region RO than the variation of the measurement value of one photometer or the like, the priority order in the overlap region RO between the absorption photometer 44 and the light scattering photometer 45 may be set.

However, when the variations of the measurement values AL1 and AL2 are approximately the same in both photometers, in consideration of the influence of the individual differences among the photometer devices, it is preferable that the switching upper limit value CSH of the light scattering photometer 45 and the switching lower limit value CSL of the absorption photometer 44 are set on the application setting screen 71, and the switching region RS is determined on the device.

In setting the switching region RS, the following methods (A), (B), and (C) can be adopted.

(A) Input the switching region RS determined from the lot of the corresponding reagent 4 by a preliminary test or the like.

(B) The switching region RS is determined from the measurement results of a plurality of optical systems, the sensitivity of the reagent 4, and the like, and the switching upper limit value CSH and the switching lower limit value CSL of the determined switching region RS are automatically set.

(C) The operator can freely input the switching upper limit value CSH and the switching lower limit value CSL. These can be set manually.

In the above (A), the user can also use the information of the switching upper limit value CSH and the switching lower limit value CSL for the switching region RS determined for each lot of reagents, for example, by a preliminary test or the like.

In the above (a), the region in which the variations of the measurement values of the absorption photometer 44 and the light scattering photometer 45 are about the same in the region of the overlap region RO is obtained and set from the measurement result of the concentration accumulated in the automatic analysis device 1.

Herein, a processing flow for automatically setting the switching region RS from the data stored in the data storage unit 55 of the automatic analysis device 1 according to the above (A) will be described. In this case, until sufficient data is stored in the data storage unit 55 of the automatic analysis device 1, by using the overlap region RO determined on the basis of the result of the preliminary test, the measurement (measurement of concentration C) of the component amount of the desired component is performed.

After the sufficient data storage results are obtained in the data storage unit 55 of the automatic analysis device 1 by a preliminary test, by plotting the concentration Ca calculated from the measurement value AL1 of the absorption photometer 44 and the concentration Cb calculated from the measurement value AL2 of the light scattering photometer 45 on the graph and analyzing the tendency of the variations of the calculated concentrations Ca and Cb caused by the absorption photometer 44 and the light scattering photometer 45, the switching region RS can be automatically set.

Figure 4:
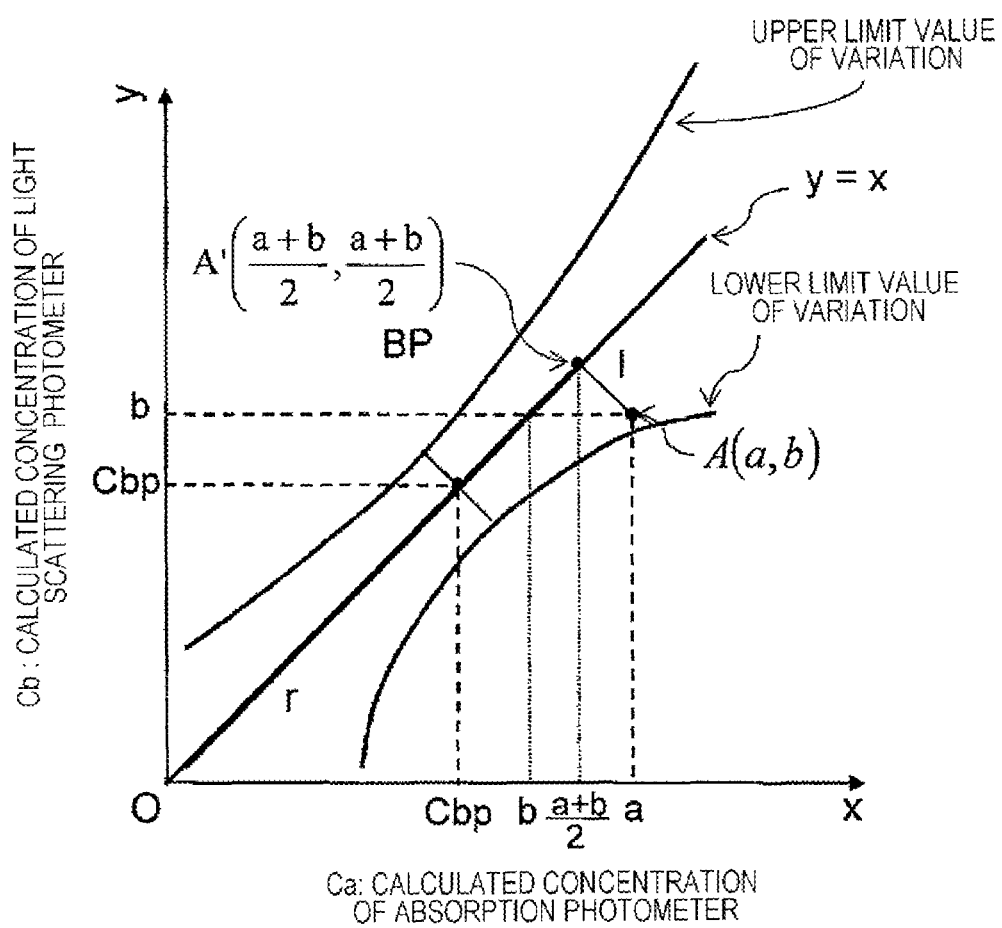
FIG. 4 is a diagram illustrating a relationship between concentrations calculated by an absorption photometer and a light scattering photometer in the automatic analysis device of the embodiment.

FIG. 4 is a diagram where a relationship between the concentration calculated from the measurement value of the absorption photometer and the concentration calculated from the measurement value of the light scattering photometer is plotted.

In FIG. 4, a combination of the concentration (x=Ca) calculated from the actual measurement value AL1 of the absorption photometer 44 and the concentration (y=Cb) calculated from the actual measurement value AL2 of the light scattering photometer 45 for the desired component contained in the same specimen 2 is plotted as (x, y)=(Ca, Cb) on the graph obtained using the vertical axis (y-axis) as a concentration (for example, [ng/ml], [µg/ml], or [mg/dl] is applied) calculated from the measurement value of the light scattering photometer 45 and the horizontal axis (x-axis) as a concentration (for example, [ng/ml], [µg/ml], or [mg/dl] is applied) calculated from the measurement value of the absorption photometer 44.

Herein, when the concentrations Ca and Cb calculated from the actual measurement values AL1 and AL2 of the absorption photometer 44 and the light scattering photometer 45 do not vary from the actual measurement values AL1 and AL2 and always indicate true values, in the graph in which both concentrations Ca and Cb are plotted, the concentration Ca by the absorption photometer 44 is the same value as the concentration Cb by the light scattering photometer 45, and both concentrations Ca and Cb are in a corresponding relation of 1:1 (that is, Ca=Cb). Therefore, in the graph illustrated in FIG. 4, the relationship between the two concentrations Ca and Cb is in accordance with the following Equation.

$$y=x$$

However, in practice, the measurement values AL for both photometers have variations. Normally, in the absorbance detection method, the variation of the measurement value AL (=AL1) on the low concentration side tends to be large, and the variation of the measurement value AL1 on the high concentration side tends to be small. On the other hand, in the light scattering detection method, the variation of the measurement value AL (=AL2) on the low concentration side tends to be small, and the variation of the measurement value AL2 on the high concentration side tends to be large.

Therefore, in the graph illustrated in FIG. 4, in the plot group of the concentrations (x, y)=(Ca, Cb) calculated from the actual measurement values AL1 and AL2 of the absorption photometer 44 and the light scattering photometer 45 for each specimen, all the plots are not distributed on the straight line indicated by y=x, but the plot group has variations around the straight line indicated by y=x.

More specifically, in the plot of the concentration (x, y)=(Ca, Cb) on the low concentration side, due to the large influence of the variation occurring in the measurement value AL1 of the absorption photometer 44, the concentration "Ca" by the absorption photometer 44 deviates from the true value on the straight line indicated by y=x and largely varies with respect to the straight line indicated by y=x. On the other hand, in the plot of the concentration (x, y)=(Ca, Cb) on the high concentration side, due to the large influence of the variation occurring in the measurement value AL2 of the light scattering photometer 45, the concentration "Cb" by the light scattering photometer 45 deviates from the true value on the straight line indicated by y=x and largely varies with the straight line indicated by y=x.

Therefore, with respect to the dynamic range of the automatic analysis device 1 from the quantification lower limit value CL1 of the quantitative range C1 of the absorption photometer 44 to the quantification upper limit value CH2 of the quantitative range C2 of the light scattering photometer 45, since each individual plot is influenced by the variations of the measurement value AL1 and AL2 of absorption photometer 44 and the light scattering photometer 45, the plot group of the concentration (x, y)=(Ca, Cb) calculated from the actual measurement values of the absorption photometer 44 and the light scattering photometer 45 for each specimen becomes plots where the concentration width of the overlap region RO, that is, the spreading of the variation with respect to the straight line indicated by y=x changes along the lengthwise direction of the straight line indicated by y=x. Herein, the spreading of the variation is expressed by the length of the perpendicular line drawn from the plot (x, y)=(Ca, Cb) of each concentration down to the straight line indicated by y=x, that is, the distance l from the straight line indicated by y=x.

The concentrations (x, y)=(Ca, Cb) calculated from the actual measurement values AL1 and AL2 of the absorption photometer 44 and the light scattering photometer 45 for each specimen have the following tendency due to the influence from variations of the measurement values AL1 and AL2 of the absorption photometer 44 and the light scattering photometer 45 described above.

In other words, in the intermediate concentration region where the variation with respect to the true value of the concentration Ca calculated from the actual measurement value AL1 of the absorption photometer 44 and the variation with respect to the true value of the concentration Cb calculated from the actual measurement value AL2 of the light scattering photometer 45 are about the same, in comparison with the concentration regions on both sides of the intermediate concentration region which becomes the low concentration side or the high concentration side, the entire plot of the concentration (x, y)=(Ca, Cb) contained in the intermediate concentration region gathers at a position of which the distance l from the straight line indicated by y=x is close, whereby the spreading of the variation with respect to the straight line indicated by y=x becomes small.

Therefore, in the overlap region RO of the quantitative ranges C1 and C2 of the absorption photometer 44 and the light scattering photometer 45, the point on the straight line y=x, that is, the point (x, y)=(Cap, Cbp)=(Cbp, Cbp) where the maximum deviation (variation) of the plot group related to the concentration (x, y)=(Ca, Cb) with respect to the straight line indicated by y=x is the smallest is calculated. Then, by using this point as the reference point BP and using the concentration Cbp corresponding to the reference point BP as the concentration reference point, the switching region including the concentration reference point Cbp in the region between the absorption photometer 44 and the light scattering photometer 45 RS can be set.

The concentration reference point Cbp of the switching region RS corresponding to such a reference point BP can be acquired as follows, in a state where the analyzed data of a sufficient number of specimens are stored in the data storage unit 55 of the automatic analysis device 1.

For example, when the analysis of one specimen A stored in the data storage unit 55 of the automatic analysis device is performed, the concentration C calculated from the measurement value AL1 by the absorption photometer 44 is set to "a", and the concentration C calculated from the measurement value AL2 by the light scattering photometer 45 is set to "b".

Then, the concentration (x, y)=(a, b) of the specimen A is plotted on the graph illustrated in FIG. 4, and the intersection of and the straight line y=x and the perpendicular line drawn from the plotted point A (a, b) to the straight line y=x is obtained, as follows.

Intersection $A'((a+b)/2, (a+b)/2)$

At this time, the distance r from the origin O to the intersection A' is expressed by the following equation.

$r = (a+b)/\sqrt{2}$

In addition, if the distance from the point located above the straight line y=x is set to be positive, the distance 1 between the points A and A' is expressed by the following equation.

$1 = (b-a)/\sqrt{2}$

Therefore, on the automatic analysis device 1, when analyzing the specimen 2, the analysis control unit 50 calculates the distance information including r and L and stores the distance information in the data storage unit 55 in association with the specimen 2 and the reagent 4 consisting the reaction solution 3.

Figure 5:
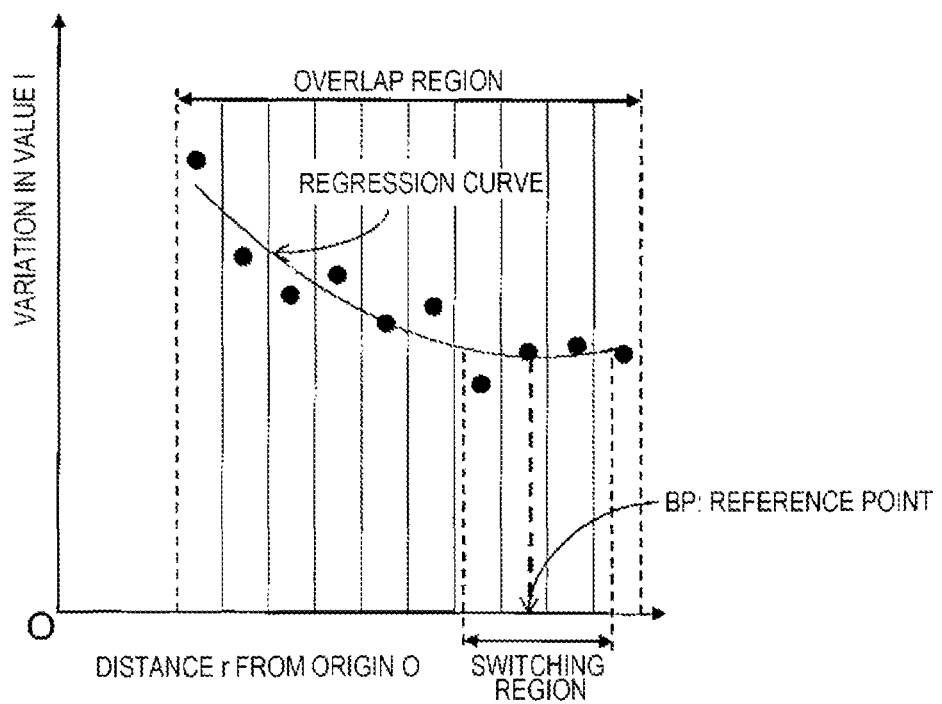
FIG. 5 is a diagram illustrating an example of calculating a concentration reference point in a switching region in the automatic analysis device of the embodiment.

FIG. 5 is a diagram illustrating an example of calculating the concentration reference point of the switching region in the automatic analysis device 1 according to the embodiment.

As illustrated in FIG. 5, the analysis control unit 50 divides the overlap region RO in which the quantitative ranges C1 and C2 of the absorption photometer 44 and the light scattering photometer 45 overlap with each other into a plurality of individual unit regions on the basis of a unit distance set in advance. Then, with respect to all the points A (a, b) of the distance r included in the individual unit region for each divided individual unit region, on the basis of the value of the distance l of each point A(a, b), the variation degree (standard deviation) σ of the distance l of the entire point A(a, b) in the individual unit region is calculated by the analysis control unit 50. In FIG. 5, the variation degree (standard deviation) σ of the distance l of the entire individual unit regions calculated for each individual unit region of the overlap region RO is plotted using black circle points ●.

In FIG. 5, the horizontal axis corresponds to the size of the distance r from the origin O to the intersection A' illustrated in the graph of FIG. 4. The size portion of the distance r corresponding to each individual unit region on the horizontal axis corresponds to the concentration C of each of the absorption photometer 44 and the light scattering photometer 45 at the corresponding position portion on the straight line y=x illustrated in FIG. 4.

From the size of the distance r and the variation degree (standard deviation) σ of the distances 1 of the individual unit regions obtained by dividing the overlap region RO of the quantitative ranges C2 and C1 of the absorption photometer 44 and the light scattering photometer 45, the analysis control unit 50 can grasp the tendency of the degree of deviation between the concentration Ca calculated from the actual measurement value of the absorption photometer 44 and the concentration Cb calculated from the actual measurement value of the light scattering photometer 45 in the overlap region RO. Furthermore, the analysis control unit 50 can also grasp the tendency of the individual unit region in which the variations of the measurement values between the absorption photometer 44 and the light scattering photometer 45 are about the same in the region of the overlap region RO.

Then, in FIG. 5, the analysis control unit 50 obtains a quadratic polynomial approximation curve or the like representing the degree of deviation between the concentration Ca by the absorption photometer 44 and the concentration Cb by the light scattering photometer 45 in the overlap region RO on the basis of the variation degree (standard deviation) σ obtained and plotted for each individual unit region corresponding to the distance r and calculates a minimum value of the quadratic polynomial approximation curve or the like. Then, the analysis control unit 50 can estimate that the distance r corresponding to the minimum value, that is, the concentration C corresponding to the distance r is about the same as the variation of the concentrations Ca and Cb measured by the absorption photometer 44 and the light scattering photometer 45 and is in the concentration range in which the level of the measurement precision is switched between the absorption photometer 44 and the light scattering photometer 45.

Then, the analysis control unit 50 sets the switching region RS of the photometer in the overlap region RO using the concentration C of the photometer to which the distance r at which the variation degree (standard deviation) σ becomes the minimum value is converted as the concentration reference point (that is, the concentration Cbp). At that time, the concentration width of the switching region RS is set to the concentration width set as the absorption/scattering result difference check value using the photometer common setting field 75 on the application setting screen 71.

In addition, when the calculated reference point BP is close to the quantification limit value of one of the photometers (specifically, the quantification lower limit value CL1 of the absorption photometer 44 or the quantification upper limit value CH2 of the light scattering photometer 45) and the concentration reference point Cbp corresponding to the concentration of the reference point BP cannot be set as the center value of the switching region RS, the switching region RS is set by setting the end value of one region of the switching region RS to be the same as this quantification limit value. In this case, the value position obtained by adding the concentration width set by the absorption/scattering result difference check from this quantification limit value or the value position obtained by subtracting the concentration width is set as the end of the other region of the overlap region RO. As a result, the switching region RS is shifted from the reference point BP in the overlap region RO, so that the width of the switching region RS is not smaller than the width of the variation of the measurement value AL of each of the absorption photometer 44 and the light scattering photometer 45.

With respect to the width of the switching region RS, eight times the variation degree (standard deviation) σ of the value of the distance l at the reference point BP, that is, the center value ±4σ of the switching region RS may be set as the concentration width of the switching region RS in the overlap region RO where the respective quantitative ranges C1 and C2 of the absorption photometer 44 and the light scattering photometer 45 overlap with each other.

When the minimum value cannot be calculated in the overlap region RO where the quantitative ranges of the absorption photometer 44 and the light scattering photometer 45 overlap with each other, the switching region RS is not set, and the photometer is selected using the setting value in the overlap region RO.

(C) Setting of Priority Order of Output

The priority order of output between the absorption photometer 44 and the light scattering photometer 45 is set to selectively output the measurement result of the photometer with higher measurement reliability. The set priority order of output is effective when, as a result of measuring the specimen, the concentration Ca calculated by the absorption photometer 44 is equal to or larger than the switching lower limit value CSL of the switching region RS or the quantification lower limit value CL1 of the quantitative range C1 and the concentration Cb calculated by the light scattering photometer 45 is equal to or smaller than the switching upper limit value CSH of the switching region RS or the quantification upper limit value CH2 of the quantitative range C2.

The priority order of output is determined in consideration of the variations of the measurement values AL of the absorption photometer 44 and the light scattering photometer 45 and the influence of coexisting substances contained in the specimen. The case where it is necessary to consider the influence of the variations of the measurement values AL is the case where there is a clear difference in the variations of the measurement values AL of the absorption photometer 44 and the light scattering photometer 45 between the absorption photometer 44 and the light scattering photometer 45 in the overlap region RO of the quantitative ranges C1 and C2 of the absorption photometer 44 and the light scattering photometer 45 by a preliminary test or the like. In this case, the priority order of output of the photometer having a smaller variation of the measurement value AL is set to be higher than the priority order of output of the photometer having a larger variation of the measurement value AL. With respect to the setting information of the priority order of output, the user can also use, for example, the information determined for each lot of reagents by a preliminary test or the like.

When the variations of the measurement values AL of the absorption photometer 44 and the light scattering photometer 45 are about the same, the priority order of output is determined in consideration of the influence of coexisting substances.

In some cases, the coexisting substances influencing the analysis of the desired component may be mixed into the specimen. The coexisting substances include lipid, hemoglobin, bilirubin, and the like, and abnormal specimens mixed with the coexisting substances are called lipemia, hemolysis, yellowness, respectively. Since the hemolysis and the yellowness change the color of the specimen, the hemolysis and the yellowness mainly influence on the absorption photometer 44, and since the lipemia changes the turbidity of the specimen, the lipemia mainly influences on the light scattering photometer 45. The automatic analysis device 1 includes a function of analyzing the concentration of the coexisting substance, and the device automatically sets the priority order of output according to the calculated influence level of the coexisting substance. A specific setting example will be described below.

In the automatic analysis device 1, the levels are classified into three stages from 1 to 3 according to the concentration and the influence level of the coexisting substances contained in the specimen. As a result of measuring the coexisting substance of the specimen, for example, when it is expected that the level of hemolysis is "1" and the level of lipemia is "2" and the influence level of the lipemia which greatly influences on the light scattering photometer 45 is larger than the influence level of the hemolysis which greatly influences on the absorption photometer 44, it can be said that the concentration calculated by the absorption photometer 44 is higher in accuracy than the concentration calculated by the light scattering photometer 45, whereby the priority order of output of the absorption photometer 44 is set to be higher.

In the parameter setting for determining the priority order of output, there is a method of comparing the level of hemolysis and/or bilirubin as a coexisting substance in the specimen with the level of lipemia as a coexisting substance and switching the priority order. In addition, when the set wavelength (main/sub wavelength of the two-wavelength photometry) of the absorption photometer 44 is set to a wavelength not influenced by coexisting substances, there is a method of switching the priority order by setting the determination criterion to the level of lipemia of the coexisting substance which greatly influences on the light scattering photometer 45. In this method, when the level of lipemia is calculated to be equal to or higher than the setting value, the component concentration of the specimen is calculated using the absorption photometer 44, and when the level is lower than the setting value, the component concentration of the specimen is calculated using the light scattering photometer 45.

When the mixing levels of the coexisting substances into the specimen are about the same between the lipemia and the hemolysis and/or the yellowness, the switching region RS in the overlap region RO of the quantitative ranges C1 and C2 is set so that the variation degrees of the measurement values become about the same, and thus, it is possible to output the concentration having the same accuracy regardless of which photometer is selected. Therefore, although any one of the absorption photometer 44 and the light scattering photometer 45 may be set to be higher in the priority order of output according to the application setting screen 71 illustrated in FIG. 2, it is preferable that the priority order of output of the absorption photometer 44 that is not easily influenced by flaws in the reaction vessel 25 and bubbles in the specimen is set to be higher. In the embodiment, the case where the priority order of output is set for each of the light scattering photometer 45 and the absorption photometer 44 is exemplified. However, the same effect can be obtained by a form of selecting a photometer for performing prioritized output.

(d) Setting of Absorption/Scattering Result Difference Check

In the automatic analysis device 1 according to the embodiment, in the case of performing the simultaneous absorption/scattering analysis, the component concentration of the specimen is measured using the absorption photometer 44 and the light scattering photometer 45 for the same specimen. In the overlap region RO of the quantitative range of each of the absorption photometer 44 and the light scattering photometer 45, as described above, the deviation occurs between the concentration calculated by the light scattering photometer 45 and the concentration calculated by the absorption photometer 44 due to the influence of the variations of the measurement values and coexisting substances. When the deviation width exceeds the width of the variation of the measurement values allowed at the clinical site, there is a possibility that an abnormality has occurred in any one of the light scattering photometer 45 and the absorption photometer 44 during the measurement. When the data deviates beyond the absorption/scattering result difference check value, the automatic analysis device 1 displays an alarm as a measurement abnormality.

At that time, the concentration width of the specimen to be set to the absorption/scattering result difference check value on the application setting screen 71 is set to the allowable maximum width in consideration of the variation of the measurement value and the influence of the coexisting substances. The determination of the occurrence of abnormality has a form of for example, by taking a difference between the concentration calculated by the light scattering photometer 45 and the concentration calculated by the absorption photometer 44, comparing the difference with the concentration width input by parameter setting of the absorption/scattering result difference check value, and displaying an alarm when the difference exceeds the setting value.

The concentration width set by the absorption/scattering result difference check value is also used for setting the concentration width of the switching region Rs between the absorption photometer 44 and the light scattering photometer 45 described above. The purpose of setting the switching region RS between the absorption photometer 44 and the light scattering photometer 45 is to prevent occurrence of a situation in which, even though the normal measured concentrations are calculated for both the absorption photometer 44 and the light scattering photometer 45, both of the measured concentrations are out of the quantitative ranges due to the variation of the measurement value, and thus, measurement errors are output. The above problem can be avoided by setting the allowable deviation width of the measurement value and using the deviation width as the concentration width of the switching region.

(2) Concentration Output Method

In describing the concentration output method by the automatic analysis device 1 according to the embodiment, first, an analysis process on the specimen requested for analysis performed by the measurement unit 51, the analysis unit 52, and the control unit 53 of the analysis control unit 50 will be described.

In the analysis control unit 50 of the automatic analysis device 1, with respect to the analysis process on the specimen requested for analysis, the control unit 53 determines whether or not the "simultaneous absorption/scattering analysis" request of measuring the same specimen using two photometers of the absorption photometer 44 and the light scattering photometer 45 is set in advance using the application setting screen 71.

When the "simultaneous absorption/scattering analysis" request is set, the control unit 53 causes the measurement unit 51 and the analysis unit 52 to perform the analysis process on the specimen requested for analysis on the basis of the measurement values AL1 and AL2 obtained from the absorption photometer 44 and the light scattering photometer 45. When the "simultaneous absorption/scattering analysis" request is not set and the analysis request by any one of the absorption photometer 44 and the light scattering photometer 45 is set, the control unit 53 causes the measurement unit 51 and the analysis unit 52 to perform the analysis process on the specimen requested for analysis on the basis of the measurement value AL1 obtained from the corresponding absorption photometer 44 or the measurement value AL2 obtained from the corresponding light scattering photometer 45.

As a result, in the analysis control unit 50, with respect to the specimen requested for analysis, the measurement unit 51 obtains the transmitted light intensity and/or scattered light intensity on the basis of the measurement values AL1 and/or AL2 obtained from the absorption photometer 44 and/or the light scattering photometer 45. Then, the measurement unit 51 stores, in the data storage unit 55, the obtained transmitted light intensity and/or scattered light intensity in association with the reaction vessel 25 into which the specimen requested for analysis is dispensed or with the analysis request of this specimen 2.

On the other hand, the analysis unit 52 converts the transmitted light intensity and/or the scattered light intensity obtained by the measurement unit 51 to the component concentration Ca and/or Cb of the desired component of the specimen using the calibration curves L1 and L2 of the corresponding reagents prepared in advance. Then, the analysis unit 52 stores, in the data storage unit 55, the calculated component concentration Ca and/or Cb of the desired component of the specimen in association with the reaction vessel 25 into which the specimen requested for analysis is dispensed or with the analysis request of the specimen 2.

At that time, the analysis unit 52 performs the technical limit checking to check whether or not the transmitted light intensity and/or the scattered light intensity obtained from the measurement values AL1 and/or AL2 are within the quantitative ranges C1 and C2 of the absorbance photometer 44 and the light scattering photometer 45 set in advance on the application setting screen 71 is carried out. Then, when the light intensities exceed the quantitative ranges C1 and C2, the analysis unit 52 adds a "technical limit error" to the calculated component concentration and stores the component concentration added with the technical limit error in the data storage unit 55.

In addition, when the "simultaneous absorption/scattering analysis" is set as the analysis request method and the same specimen is analyzed using the absorption photometer 44 and the light scattering photometer 45, the analysis unit 52 performs absorption/scattering result difference check. In this absorption/scattering result difference check, it is checked whether or not a deviation exceeding the concentration value of the "absorption/scattering result difference check value" set in the application setting illustrated in FIG. 2 has occurred between the concentration Ca calculated by the absorption photometer 44 and the concentration Cb calculated by the light scattering photometer 45. When the deviation width between the concentrations Ca and Cb calculated by the absorption photometer 44 and the light scattering photometer 45 exceeds the setting value, there is a possibility that an abnormality has occurred in any one photometer of the absorbance photometer and the light scattering photometer 45 during the measurement due to the influence of variations of the measurement values and coexisting substances. When the deviation width between the concentrations Ca and Cb by the absorption photometer 44 and the light scattering photometer 45 respectively exceeds the setting value, the analysis unit 52 adds the "absorption/scattering result difference error" to the concentrations Ca and Cb, and stores the concentrations added with the absorption/scattering result difference error in the data storage unit 55.

In addition, when the control unit 53 determines that an abnormality has occurred during the analysis operation of the specimen for which the analysis request has been made and a measurement error due to an abnormality has occurred, when storing the calculated component concentrations Ca and/or Cb of the desired component of the specimen in the data storage unit 55, the analysis unit 52 adds the "error during analysis operation". During the analysis operation, the control unit 53 controls the operation of each of the constituent units in the automatic analysis device 1 such as the disks 10, 20, and 30, the dispensing mechanisms 41 and 42, the photometers 44 and 45 and monitors whether or not an abnormality has occurred in any one of the components.

Then, in the analysis control unit 50, with respect to the specimen requested for analysis, the output of the analysis result by the measurement unit 51 and the analysis unit 52 to the output unit 61 is controlled by the simultaneous absorption/scattering analysis determination unit 56, the measurement abnormality checking unit 57, the concentration range checking unit 58, and the prioritized output determination unit 59. The output control of the analysis result will be described with reference to FIG. 6.

Figure 6:
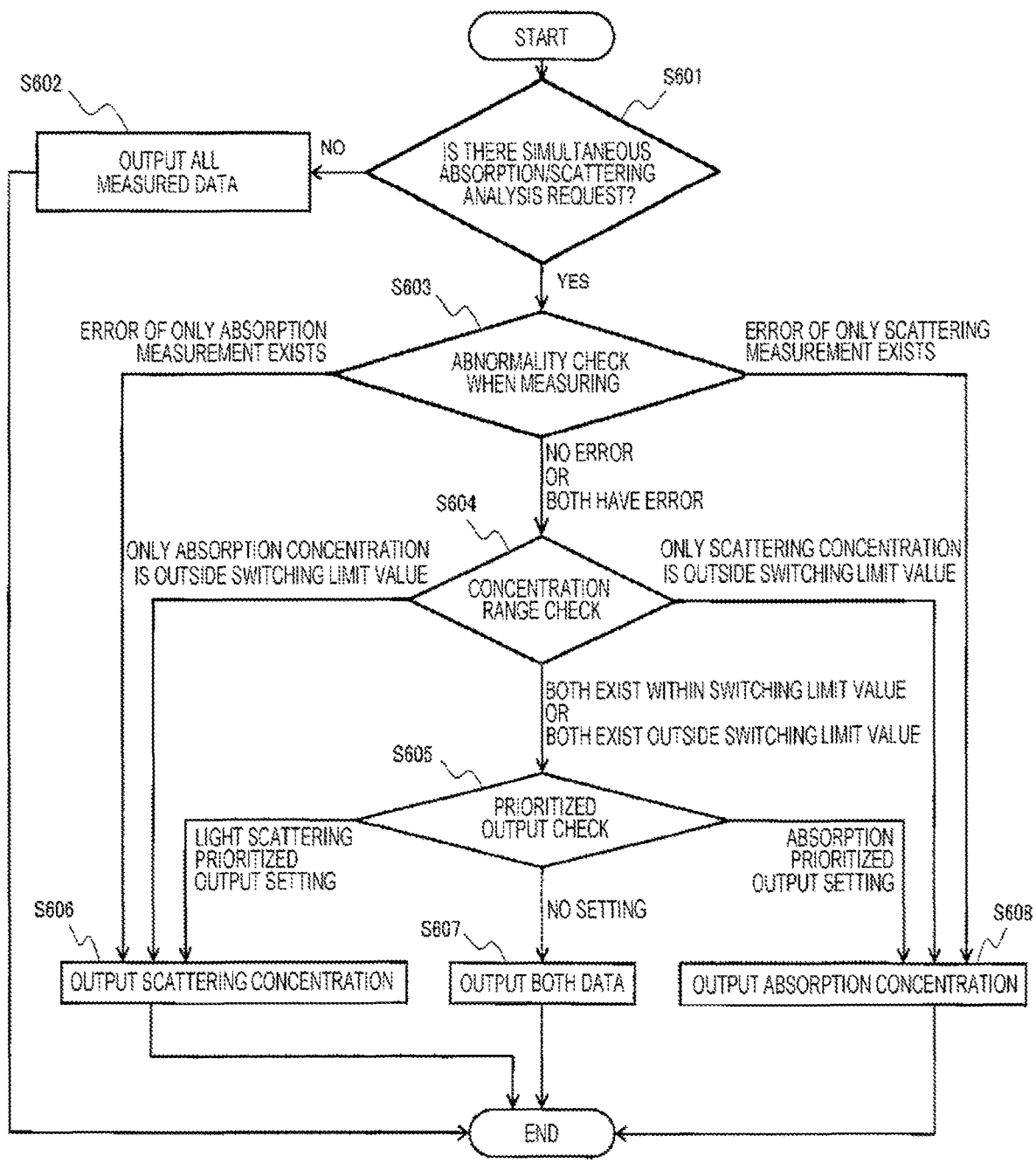
FIG. 6 is a flowchart of a process of selecting a photometer used for quantitative output (concentration output) of a desired component or a quantitative result of the desired component in the automatic analysis device of the embodiment.

FIG. 6 is a concentration output determination flowchart for selecting the photometer to be used for concentration output of the desired component using the absorption photometer and/or the light scattering photometer.

With respect to the specimen of which the analysis result is output to the output unit 61, the simultaneous absorption/scattering analysis determination unit 56 determines whether or not the measurement request format of the specimen set on the application setting screen 71 at the time of the analysis request is the "simultaneous absorption/scattering analysis" request of measuring the same specimen using two photometers of the absorption photometer 44 and the light scattering photometer 45 (step S601).

When it is determined that the "simultaneous absorption/scattering analysis" request is not set, that is, that the analysis request by any one of the absorption photometer 44 and the light scattering photometer 45 is set, the simultaneous absorption/scattering analysis determination unit 56 outputs all the data measured by any set one of the absorption photometer 44 and the light scattering photometer 45 to the output unit 61 (step S602). As a result, the data measured by the set photometer including the concentration by the set photometer is output from the output unit 61.

In addition, as a measurement request format of the specimen that is not requested for the simultaneous absorption/scattering analysis, there are a single item request using only the absorption photometer 44 or the light scattering photometer 45, a simultaneous absorption/absorption analysis request of analyzing two kinds of desired components of a specimen in the same reaction vessel as a measurement target using only the absorption photometer 44, and the like.

On the other hand, when it is determined that the "simultaneous absorption/scattering analysis" request is set, the simultaneous absorption/scattering analysis determination unit 56 outputs all the data measured by the absorption photometer 44 and the light scattering photometer 45 including the concentration Ca calculated by the absorption photometer 44 and the concentration Cb calculated by the light scattering photometer 45 with respect to the specimen requested for analysis through the measurement abnormality checking unit 57.

When the "simultaneous absorption/scattering analysis" request is set, the measurement abnormality checking unit 57 determines whether the concentrations Ca and Cb calculated by the absorption photometer 44 and the light scattering photometer 45 respectively have been measured normally (step S603). More specifically, the measurement abnormality checking unit 57 determines whether or not the concentrations Ca and Cb have been measured normally on the basis of whether or not an "technical limit error" is added to any one of the concentrations Ca and Cb for the concentrations Ca and Cb calculated by the absorption photometer 44 and the light scattering photometer 45, whether or not an "absorption/scattering result difference error" is added to both of the concentrations Ca and Cb, and whether or not an "error during analysis operation" is added to any one of the concentrations Ca and Cb.

The "technical limit error" indicates that the light intensity (transmitted light intensity or scattered light intensity) obtained by the measurement unit is not within the quantitative range (C1 or C2), and when there is an error, the technical limit error is added individually for each of the concentrations Ca and Cb where the error is identified. The "absorption/scattering result difference error" indicates that the concentrations Ca and Cb by the absorption photometer 44 and the light scattering photometer 45, respectively, are deviated beyond the setting values, and when there is an error, the "absorption/scattering result difference error" is added to both the concentrations Ca and Cb. The "error during analysis operation" indicates that a measurement error due to the occurrence of the abnormality occurs during the analysis operation, and in case where there is an error, the error during analysis operation is added individually for each of the concentrations Ca and Cb where the error is identified.

As a result of this determination, if it is determined that there is an error in the measurement value AL1 obtained from the absorption photometer 44 and the transmitted light intensity and there is no error in the measurement value AL2 obtained from the light scattering photometer 45 and the scattered light intensity, the measurement abnormality checking unit 57 outputs only all the data measured by the light scattering photometer 45, including the concentration Cb by the light scattering photometer 45, to the output unit 61 (step S606). As a result, the output unit 61 preferentially outputs the data having no error, measured by the light scattering photometer 45 including the concentration Cb by the light scattering photometer 45.

On the other hand, if it is determined that there is no error in the measurement value AL1 obtained from the absorption photometer 44 and the transmitted light intensity and there is an error in the measurement value AL2 obtained from the light scattering photometer 45 and the scattered light intensity, the measurement abnormality checking unit 57 outputs only all the data measured by the absorption photometer 44 including the concentration Ca by the absorption photometer 44 to the output unit 61 (step S608). As a result, the output unit 61 preferentially outputs the data measured by the absorption photometer 44, including the concentration Ca by the absorption photometer 44, where there is no error.

In addition, if it is determined that the concentrations Ca and Cb calculated by the absorption photometer 44 and the light scattering photometer 45 are both normal outputs or both are error outputs, the measurement abnormality checking unit 57 outputs all the data measured by the absorption photometer and the light scattering photometer 45 through the concentration range checking unit 58. This output data also includes the concentration Ca calculated by the absorption photometer 44 and the concentration Cb calculated by the light scattering photometer 45 for the specimen requested for analysis.

In step S601, it is determined that the simultaneous absorption/scattering analysis is set, and in step S603, when it is determined that the concentrations Ca and Cb calculated by the absorption photometer 44 and the light scattering photometer 45, respectively, are measured normally, the concentration range checking unit 58 checks the concentration ranges of the concentrations Ca and Cb calculated by the absorption photometer 44 and the light scattering photometer 45, respectively (step S604). With respect to the concentrations Ca and Cb calculated by the absorption photometer 44 and the light scattering photometer 45, the concentration range checking unit 58 determines whether or not the concentration Cb by the light scattering photometer 45 is equal to or smaller than the switching upper limit value CSH of the switching region RS or determines whether or not the concentration Ca by the absorption photometer 44 is equal to or larger than the switching lower limit value CSL.

If the concentration range checking unit 58 determines that the concentration Cb calculated by the light scattering photometer 45 is equal to or smaller than the switching upper limit value CSH and the output concentration of the concentration Ca calculated by the absorption photometer 44 is smaller than the switching lower limit value CSL, the concentration range checking unit 58 outputs only all the data measured by the light scattering photometer 45, including the concentration Cb by the light scattering photometer 45, to the output unit 61 (step S606). This determination state indicates that the component concentration of the specimen is in the concentration region where the variation of the measurement value AL1 of the absorption photometer 44 is large and the variation of the measurement value AL2 of the light scattering photometer 45 is small. As a result, only the data measured by the light scattering photometer 45 including the concentration Cb calculated by the light scattering photometer 45 is output from the output unit 61.

When the concentration range checking unit 58 determines that the concentration Cb calculated by the light scattering photometer 45 exceeds the switching upper limit value CSH and the output concentration of the concentration Ca calculated by the absorption photometer 44 is equal to or larger than the switching lower limit value CSL, The concentration range checking unit 58 outputs only all data measured by the absorption photometer 44, including the concentration Ca by the absorption photometer 44, to the output unit 61 (step S608). This determination state indicates that the component concentration of the specimen is in the concentration region where the variation of the measurement value AL1 of the absorption photometer 44 is small and the variation of the measurement value AL2 of the light scattering photometer 45 is large. As a result, only the data measured by the absorption photometer 44 including the concentration Ca calculated by the absorption photometer 44 is output from the output unit 61.

If the concentration range checking unit 58 determines that the concentration Cb calculated by the light scattering photometer 45 exceeds the switching upper limit value CSH and the output concentration of the concentration Ca calculated by the absorption photometer 44 is smaller than the switching lower limit value CSL, or that the concentration Cb calculated by the light scattering photometer 45 is equal to or smaller than the switching upper limit value CSH and the concentration Ca calculated by the absorption photometer 44 is equal to or larger than the switching lower limit value CSL, the concentration range checking unit 58 outputs all the data measured by the absorption photometer 44 and the light scattering photometer 45 through the prioritized output determination unit 59. This output data also includes the concentration Ca calculated by the absorption photometer 44 and the concentration Cb calculated by the light scattering photometer 45.

In this determination, the configuration that the concentration Cb calculated by the light scattering photometer 45 exceeds the switching upper limit value CSH and the output concentration of the concentration Ca calculated by the absorption photometer 44 is smaller than the switching lower limit value CSL denotes that both the calculated concentration Ca calculated by the absorption photometer 44 and the concentration Cb calculated by the light scattering photometer 45 are out of the switching region RS. This indicates that the deviation width between the concentration Ca calculated by the absorption photometer 44 and the concentration Cb calculated by the light scattering photometer 45 exceeds the width of the variation of the measurement values allowed at the clinical site, whereby the "absorption/scattering result difference error" is added to both the calculated concentrations Ca and Cb.

In addition, in this determination, the configuration that the concentration Cb calculated by the light scattering photometer 45 is equal to or smaller than the switching upper limit value CSH and the concentration Ca calculated by the absorption photometer 44 is equal to or larger than the switching lower limit value CSL denotes that both of the absorption photometer 44 and the light scattering photometer 45 are within the switching limit value and are within the quantitative ranges C1 and C2. The configuration that both of the absorption photometer 44 and the light scattering photometer 45 are within the switching limit value and are within the quantitative ranges C1 and C2 includes that any one of the concentration Ca calculated by the absorption photometer 44 and the concentration Cb calculated by the light scattering photometer 45 is within the switching region RS.

When it is determined in step S601 that the simultaneous absorption/scattering analysis request is set, it is determined in step S603 that both of the concentrations Ca and Cb calculated by the absorption photometer 44 and the light scattering photometer 45, respectively, are measured normally, and it is determined in step S604 that the concentration Cb by the light scattering photometer 45 is equal to or smaller than the switching upper limit value CSH of the switching region RS and the concentration Ca by the absorption photometer 44 is equal to or larger than the switching lower limit value CSL, the prioritized output determination unit 59 performs the prioritized output determination of the photometer for each of the absorption photometer 44 and the light scattering photometer 45 (step S605). That is, the prioritized output determination unit 59 determines the prioritized output of each of the absorption photometer 44 and the light scattering photometer 45 on the basis of the "prioritized output determination/priority order" of each of the absorption photometer 44 and the light scattering photometer 45 set on the application setting screen 71 at the time of the analysis request.

More specifically, as illustrated on the application setting screen 71 illustrated in FIG. 2, when the output of the concentration Cb by the light scattering photometer 45 is set to be prioritized with respect to the output of the concentration Ca by the absorption photometer 44, the prioritized output determination unit 59 outputs only all the data measured by the light scattering photometer 45, including the concentration Cb by the light scattering photometer 45, to the output unit 61 (step S606). As a result, the output unit 61 preferentially outputs the data having no error, measured by the light scattering photometer 45 including the concentration Cb by the light scattering photometer 45.

On the contrary, when the output of the concentration Ca by the absorption photometer 44 is set to be prioritized with respect to the output of the concentration Cb by the light scattering photometer 45, the prioritized output determination unit 59 outputs only all the data measured by the absorption photometer 44, including the concentration Ca by the absorption photometer 44, to the output unit 61 (step S608). As a result, the output unit 61 preferentially outputs the data having no error, measured by the absorption photometer 44 including the concentration Cb by the absorption photometer 44.

In addition, when the priority order of output is not set between the absorption photometer 44 and the light scattering photometer 45, all the data, including the concentration Ca calculated by the absorption photometer 44 and the concentration Cb calculated by the light scattering photometer 45, measured by the absorption photometer 44 and the light scattering photometer 45 are output to the output unit 61 (step S607). As a result, the output unit 61 outputs all the data measured by the absorption photometer 44 and the light scattering photometer 45, including the concentration Ca by the absorption photometer 44 and the concentration Cb by the light scattering photometer 45.

In addition, when the data measured by the absorption photometer 44 and/or the light scattering photometer 45 as a result of the priority determination is output to the output unit 61 (steps S606, S607, and S608), when an error such as the "absorption/scattering result difference error" is added to the concentration Ca by the absorption photometer 44 and/or the concentration Cb of the light scattering photometer 45, the prioritized output determination unit 59 also adds an error to the data to be output to the output unit 61. Therefore, as the output from the output unit 61 in steps S606 to S608, in a case where an error such as the "absorption/scattering result difference error" is added, the error content is also output in correspondence to the data measured by the absorption photometer 44 and the light scattering photometer 45.

As described above, the automatic analysis device according to the embodiment includes the absorption photometer and the light scattering photometer 45 and has a configuration of analyzing each analysis item simultaneously using the two photometers of the absorption photometer 44 and the light scattering photometer 45, setting the overlap region RO and/or the switching region RS in which quantification can be performed by any one of the photometers, at the same time, setting the priority order of output of the photometers used for concentration output between the two photometers, and, when the concentrations of the specimen calculated by the two photometers exist in the concentration ranges C1 and C2 in which quantification can be performed by both, selecting the photometer with a higher priority order d on the basis of the priority order of output of the set photometer, and determining the concentration based on the light detected by the selected photometer as the concentration of the specimen. As a result, it is possible to output the measurement result without causing a selection error of the photometer in the concentration range requiring the selection of the absorption photometer 44 and the light scattering photometer 45, whereby there is no need for the clinical side to perform the re-examination accompanying the error. Therefore, it is possible to accurately perform switching selection between the absorption photometer 44 and the light scattering photometer 45 without causing a selection error of the photometer and to execute the measurement of the component amount of the desired component contained in the specimen with high accuracy and high speed.

In addition, in the above-described embodiment, the reference point BP and the concentration reference point Cbp are not used when outputting the data of the absorption photometer 44 and the light scattering photometer 45 in order to produce the switching region RS in the overlap region RO. However, the inside of the switching region RS is further divided into a plurality of sub switching regions rs with reference to the reference point BP and the concentration reference point Cbp, and according to a pattern of which of the plurality of sub switching regions rs includes the concentrations measured by the absorption photometer 44 and the light scattering photometer 45, even when the data output of each of the absorption photometer 44 and the light scattering photometer 45 is included in the switching region RS, the photometer that performs outputting corresponding to the sub switching region rs may be allowed to be automatically selected.

In addition, in the above example, the case where the two photometers of the absorption photometer 44 and the light scattering photometer 45, are used is exemplified. However, the present disclosure is also applicable to the cases where a photometer of another type or a plurality of different types of photometers are used. For example, the present disclosure is applicable to an automatic analysis device equipped with two light scattering photometers having different wavelengths and light quantities of light sources and light receiving angles, an automatic analysis device equipped with two absorption photometers with varying optical path lengths transmitted through the reaction vessel, or an automatic analysis device equipped with three or more photometers configured by combining the light scattering photometer or the absorption photometer, in a concentration region where the switching of the photometers is necessary.

REFERENCE SIGNS LIST

1: automatic analysis device
2: specimen
3: reaction solution
4: reagent
10: specimen disk
11: disk main body
12: driving unit
15: specimen cup
20: reaction disk
21: disk main body
22: driving unit
25: reaction vessel
28: thermostatic bath
30: reagent disk
31: disk main body
32: driving unit
35: reagent bottle
38: reagent refrigerator
41: specimen dispensing mechanism
42: reagent dispensing mechanism
43: stirring unit
44: absorption photometer
45: light scattering photometer
46: washing unit
50: analysis control unit
51: measurement unit
52: analysis unit
53: control unit
54: constant temperature fluid control unit
55: data storage unit
56: simultaneous absorbance scattering analysis determination unit
57: measurement abnormality checking unit
58: concentration range checking unit
59: prioritized output determination unit
61: output unit
62: input unit
70: operation unit
71: application setting screen
72: item selection field
73: parameter setting field
75: photometer common setting field
76: absorption photometer dedicated setting field
77: light scattering photometer dedicated setting field
L1: calibration curve of absorption photometer
AL2: measurement data
AL1: measurement data
L2: calibration curve of light scattering photometer
C1: quantitative range of absorption photometer
C2: quantitative range of light scattering photometer
CL1: quantification lower limit value of absorption photometer
CH2: quantification upper limit value of light scattering photometer
RO: overlap region
RS: switching region
Cs: switching threshold value
CSH: switching upper limit value of light scattering photometer
CSL: switching lower limit value of absorption photometer
BP: reference point
R: distance
l: distance
CF: regression curve
Ca: calculated concentration by absorption photometer
Cb: calculated concentration by light scattering photometer
Cbp: concentration reference point corresponding to reference point BP All publications, patents, and patent applications cited in this specification are incorporated herein by reference in their entirety.

What is claimed is:

1. An automatic analysis device comprising:
a plurality of types of photometers having different quantitative ranges; and
an analysis control unit that quantifies a desired component in a specimen on the basis of measurement values of one or a plurality of photometers selected from the plurality of types of photometers;
wherein the analysis control unit is configured to select, on the basis of a quantitative value of a quantitative range portion corresponding to a switching region including a region width larger than a variation of a quantitative value of the desired component based on a measurement value of each photometer for the same specimen in an overlap region of each of the quantitative ranges of the plurality of types of photometers and the quantitative value of the desired component based on the measurement value of each of the photometers, the photometer to be used for quantitative output of the desired component from the plurality of types of photometers.

2. The automatic analysis device according to claim 1, wherein,
in the switching region, among the quantitative values of the portion of the quantitative range corresponding to the switching region:
the quantitative value at a region edge on a low concentration side becomes a low concentration side switching limit value for canceling the selection of the photometer for high concentration measurement in which the quantitative range extends toward the high concentration side with respect to the switching region, and
the quantitative value at a region edge on a high concentration side becomes a high concentration side switching limit value for canceling the selection of the photometer for low concentration measurement in which the quantitative range extends toward the low concentration side with respect to the switching region.

3. The automatic analysis device according to claim 2, further comprising:
a prioritized output determination unit that determines the quantitative value of the desired component based on the measurement value of the photometer having a higher priority as a quantitative value for output on the basis of the priority order set in advance between the photometer for high concentration measurement and the photometer for low concentration measurement, when the quantitative value of the desired component based on the measurement value of the photometer for high concentration measurement is equal to or larger than the low concentration side switching limit value and the quantitative value of the desired component based on the measurement value of the photometer for low concentration measurement is equal or smaller than the high concentration side switching limit value.

4. The automatic analysis device according to claim 1, wherein
the switching region is formed in the overlap region on the basis of a reference point where a variation of the desired component based on the measurement value of the photometer for high concentration measurement in which the quantitative range extends toward the high concentration side with respect to the overlap region and a variation of the desired component based on the measurement value of the photometer for low concentration measurement in which the quantitative range extends toward the low concentration side with respect to the overlap region are about the same.

5. The automatic analysis device according to claim 4, wherein,
when the reference point does not occur within the overlap region, the switching region is matched with the overlap region.

6. The automatic analysis device according to claim 4, wherein
the reference point is located on a straight line of y=x, where a concentration measurement value x by the photometer for high concentration measurement and a concentration measurement value y by the photometer for low concentration measurement are in a corresponding relationship of 1:1.

7. The automatic analysis device according to claim 1, wherein
the plurality of types of photometers are transmitted light photometers and light scattering photometers.

8. The automatic analysis device according to claim 1, wherein
the plurality of types of photometers are a plurality of light scattering photometers having different wavelengths or amounts of light of light sources or light receiving angles.

9. The automatic analysis device according to claim 1, further comprising:
a setting unit for setting the switching region,
the setting unit including:
a photometer common setting field for setting information on a specimen and a photometer to be used for analysis from the plurality of types of photometers; and
a photometer dedicated setting field for setting preset information for quantifying the desired component for each of the plurality of types of photometers.

10. The automatic analysis device according to claim 1, further comprising:
an error detection unit for comparing the measurement values of the plurality of types of photometers with each other in the overlap region of the quantitative ranges of the plurality of types of photometers and detecting a measurement error of the quantitative value of the desired component on the basis of a difference between the measurement values among the plurality of types of photometers.

11. An automatic analysis device, comprising:
a plurality of types of photometers having different quantitative ranges, and
an analysis control unit that quantifies a desired component in a specimen on the basis of measurement values of one or a plurality of photometers selected from the plurality of types of photometers,
wherein the analysis control unit is configured to select, on the basis of a quantitative value of the quantitative range portion corresponding to an overlap region of quantitative ranges of the plurality of types of photometers and a quantitative value of the desired component based on the measurement value of each of the photometers, the photometer to be used for quantitative output of the desired component from the plurality of types of photometers.

12. The automatic analysis device according to claim 11, wherein
the plurality of types of photometers are transmitted light photometers and light scattering photometers.

13. The automatic analysis device according to claim 11, wherein
the plurality of types of photometers are a plurality of light scattering photometers having different wavelengths or amounts of light of light sources or light receiving angles.

14. The automatic analysis device according to claim 11, further comprising:
a setting unit for setting the switching region, wherein the setting unit includes:
a photometer common setting field for setting information on a specimen and a photometer to be used for analysis from the plurality of types of photometers, and a photometer dedicated setting field for setting preset information for quantifying the desired component for each of the plurality of types of photometers.

15. The automatic analysis device according to claim 11, further comprising:

an error detection unit for comparing the measurement values of the plurality of types of photometers with each other in the overlap region of the quantitative ranges of the plurality of types of photometers and detecting a measurement error of the quantitative value of the desired component on the basis of a difference between the measurement values among the plurality of types of photometers.

* * * * *